(12) United States Patent
Saito et al.

(10) Patent No.: US 6,301,674 B1
(45) Date of Patent: *Oct. 9, 2001

(54) POWER CONTROL METHOD, POWER CONTROL SYSTEM AND COMPUTER PROGRAM PRODUCT FOR SUPPLYING POWER TO A PLURALITY OF ELECTRIC APPARATUSES CONNECTED TO A POWER LINE

(75) Inventors: Takeshi Saito, Tokyo; Eiji Kamagata, Kawasaki; Yukio Kamatani; Yoshiaki Takabatake, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/456,549

(22) Filed: Dec. 8, 1999

Related U.S. Application Data

(63) Continuation of application No. 08/926,969, filed on Sep. 10, 1997, now Pat. No. 6,018,690.

(30) Foreign Application Priority Data

Sep. 13, 1996 (JP) .................................................. 8-243882

(51) Int. Cl.$^7$ ...................................................... G06F 1/30
(52) U.S. Cl. .......................... 713/340; 713/330; 713/310; 713/320; 700/295; 700/293
(58) Field of Search .................................... 713/300, 310, 713/320, 321, 324, 330, 340, 323; 364/528.3, 528.27, 528.28; 700/295, 293

(56) References Cited

U.S. PATENT DOCUMENTS

| | | | |
|---|---|---|---|
| 4,549,274 | * 10/1985 | Lerner et al. | 364/528.3 |
| 5,191,520 | * 3/1993 | Eckersley | 363/72 |
| 5,272,585 | * 12/1993 | Gibbs | 361/64 |
| 5,483,656 | * 1/1996 | Oprescu et al. | 713/323 |
| 5,572,438 | * 11/1996 | Ehlers et al. | 364/528.3 |
| 5,754,445 | * 5/1998 | Jouper et al. | 364/528.3 |
| 6,018,690 | * 1/2000 | Saito et al. | 700/295 |

* cited by examiner

Primary Examiner—Robert Beausoleil
Assistant Examiner—Raymond N Phan
(74) Attorney, Agent, or Firm—Oblon, Spivak, McClelland, Maier & Neustadt, P.C.

(57) ABSTRACT

In supplying power to a plurality of electric apparatuses connected to a power line having a predetermined maximum consumable power, a power consumption of the power line is measured as a first power consumption. When a second power consumption predetermined in each of the electric apparatuses is told, a sum of the second power consumption and the first power consumption of the power line is compared with the predetermined maximum consumable power of the power line, and it is determined whether the second power consumption by the electric apparatus is permissible. A result of the determination is told to the electric apparatuses.

13 Claims, 29 Drawing Sheets

FIG. 25A | MAKER ID | PRODUCT ID | PRODUCT NUMBER |

FIG. 25B | ATTRIBUTE SERVER ADDRESS | MAKER ID | PRODUCT NUMBER |

FIG. 25C | ATTRIBUTE SERVER ADDRESS | MAKER ID | PRODUCT ID | PRODUCT NUMBER |

FIG. 25D | ATTRIBUTE SERVER ADDRESS | PRODUCT NUMBER |

POWER CONTROL METHOD, POWER CONTROL SYSTEM AND COMPUTER PROGRAM PRODUCT FOR SUPPLYING POWER TO A PLURALITY OF ELECTRIC APPARATUSES CONNECTED TO A POWER LINE

This application is a Continuation of application Ser. No. 08/926,969 Filed on Sep. 10, 1997 now U.S. Pat. No. 6,018,190.

BACKGROUND OF THE INVENTION

The present invention relates to a communication system for constructing a network of household electric devices, which are conventionally used separately, and managing and controlling these electric devices.

Recently, attention has been paid to the use of communication techniques, including the Internet, in various fields. To keep pace with this movement, government restrictions have been gradually relaxed, and the construction of networks, such as CATV, local telephones and satellite communication, which involve the participation of domestic (home) users, have been developed. In addition, the following systems, for example, have been studied: a system wherein a subscriber network is constructed by using the CATV network, a system wherein conventional telephone lines are converted to wide-band ones, and an FTTH (Fiber-To-The-Home) system wherein optical fibers are extended to homes.

Various studies have been necessary on home access networks such as public networks and subscriber networks, as well as on communication terminals in homes located at terminals of subscriber networks and on home networks accommodating terminals in homes. The reason is that most of communication terminals existing in homes are telephones and facsimiles, and the other terminals are used in a stand-alone state. For example, techniques of a multimedia serial bus such as IEEE 1394, household ATM networks, etc. have been studied, and standardization of new home networks has been developed.

In the IEEE 1394 or ATM network, household personal computers, audio products, and video media transmission/reception products such as video recorders and TV sets are connected in a network. In general, there is a basic tendency that a basic plan, a set top box, a VTR, a video camera, a TV, a personal computer, etc. are to be interconnected. However, there are other types of devices which could be incorporated in a network. For example, household electric devices, such as air-conditioners, irons, electronic ovens and refrigerators, have conventionally been used as stand-alone devices. However, there is a demand for a household network constructed by interconnecting these devices by using a medium such as a power line LAN. If the household network is constructed, the turn on/off of the household electric devices can be controlled from a far place via the Internet, or the electric devices can be controlled in a centralized control manner.

In the power line LAN communication system, a power line for supplying power is used as transmission media, and power is supplied and data and messages are transmitted among the electric devices. Although there are many problems to be solved in connection with this communication system, for example, modulation of data signals, this system can achieve a network of household electric devices without varying the mode of use of conventional devices. Therefore, particular attention has been paid to this communication system.

In general, the household power line is connected via a circuit breaker to a cable from an electric power company, and it is extended to the outlets in the respective rooms. This network of the power line is called "power supply network" in this description. A general power supply network, however, is provided with only two functions: a measuring function of measuring consumed power and a circuit breaking function for stopping power supply for safety, in case power greater than a predetermined value is supplied. Such a general power supply network has no intelligent function. When high-power devices, such as a hair drier, an electronic oven, a vacuum cleaner and an air conditioner, are used at the same time and the power consumption exceeds an upper limit of household power supply, such an undesirable situation often occurs wherein the circuit breaker is switched off and, for example, a file in a personal computer, which is being edited, is lost.

As has been described above, the currently available power supply network has no intelligent function. For example, when some high-power household electric devices are used at the same time and the power consumption exceeds a predetermined value, the circuit breaker is merely activated, and all electric devices connected to the power supply network may be affected.

There arise the following problems when a network of household electric devices is constructed and power supply control is performed:

Problem 1: Information processing functional parts and communication functional parts for transmitting/receiving data within the network are expensive, and so these parts must be provided at low cost.

Problem 2: It is necessary that even a person not skilled in the network techniques can easily construct the household network. For example, such a useful function as "plug-and-play" needs to be provided.

Problem 3: When management control of household electric devices is performed by using a network, it is necessary to acquire and manage various data of the electric devices relating to the classification of electric devices and attributes (life periods, consumption power, method of use, etc.). At present, however, household electric devices have not yet been fully classified. It is highly possible that novel devices and new attributes will appear more and more, which cannot be classified according to the existing classification method. In particular, classification of new attributes is not limited to the one proposed by the standardization organization. Accordingly, classification information and attribute information is hardly managed, if it is preset in electric devices. Therefore, there is a demand for a novel management method of classification information and attribute information of electric devices, which can cope with the advent of new electric devices.

BRIEF SUMMARY OF THE INVENTION

The present invention aims at providing a power supply control method and a power supply control system for controlling power supply on the basis of attributive information of household electric apparatuses in a network, which electric apparatuses are conventionally used as separate apparatuses.

According to one aspect of the present invention, there is provided a power control method for supplying power to a plurality of electric apparatuses connected to a power line having a predetermined maximum consumable power, the method comprising: a step of measuring a power consumption of the power line as a first power consumption; a first telling step of telling a second power consumption predetermined in each of the electric apparatuses; a determination step of comparing a sum of the second power consumption told in the first telling step and the first power consumption of the power line with the predetermined maximum consumable power of the power line, and determining whether the second power consumption by the electric apparatus is permissible; and a second telling step of telling a determination result in the determination step to the electric apparatuses.

Thus, power can be supplied to a plurality of electric apparatuses so that a predetermined maximum consumable power of the power line may not be exceeded. For example, such an undesirable situation is prevented from arising, wherein a household maximum power consumption is exceeded due to simultaneous use of electric apparatuses requiring large power and the breaker circuit is switched off. In other words, in a power supply network comprising a plurality of electric apparatuses, power consumption greater than a predetermined value can be prevented.

According to another aspect of the invention, there is provided a power control method for supplying power to a plurality of electric apparatuses connected to each of a plurality of power lines each having a predetermined maximum consumable power, the method comprising: a measuring step of measuring a power consumption of each power line as a first power consumption; a first telling step of telling a second power consumption predetermined in each of the electric apparatuses; a first determination step of comparing a sum of the second power consumption told in the first telling step and the first power consumption of the power line with the predetermined maximum consumable power of each power line, and determining whether the second power consumption by the electric apparatus is permissible; a second determination step of comparing, when the second power consumption by the electric apparatus has been determined to be permissible in the first determination step, a total sum of the second power consumption and the first power consumptions of the plural power lines with the predetermined maximum consumable powers of the plural power lines, and determining whether the second power consumption by the electric apparatus is permissible; and a second telling step of telling a determination result in the second determination step to the electric apparatus.

Thus, power can be supplied to a plurality of electric apparatuses so that a predetermined maximum consumable power of the power line may not be exceeded. In addition, in a power supply network comprising a plurality of electric apparatuses, power consumption greater than a predetermined value can be prevented.

According to still another aspect of the invention, there is provided a power supply control method for supplying power to a plurality of electric apparatuses connected to a power line having a predetermined maximum consumable power, the method comprising: a telling step of telling identification information of each of the plural electric apparatuses; a search step of searching for attribute information of the electric apparatus on the basis of the identification information told in the telling step; and a control step of performing a control for supplying power to the plural electric apparatuses on the basis of the attribute information obtained in the search step.

Thus, it is not necessary for the electric apparatus to have storage means for storing attribute information of the electric apparatus, which information is necessary for management/control of the electric apparatus, or means for telling attribute information. Specifically, there is no need to add high-cost information processing functions and communication functions to the electric apparatuses when the electric apparatuses, which are generally used as separate apparatuses because of conditions of costs, are connected to a network. Therefore, a home network can be constituted easily.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 25A to 25D show product IDs stored in a product ID storage shown in FIG. 24;

DETAILED DESCRIPTION OF THE INVENTION (First Embodiment)

Figure 1:
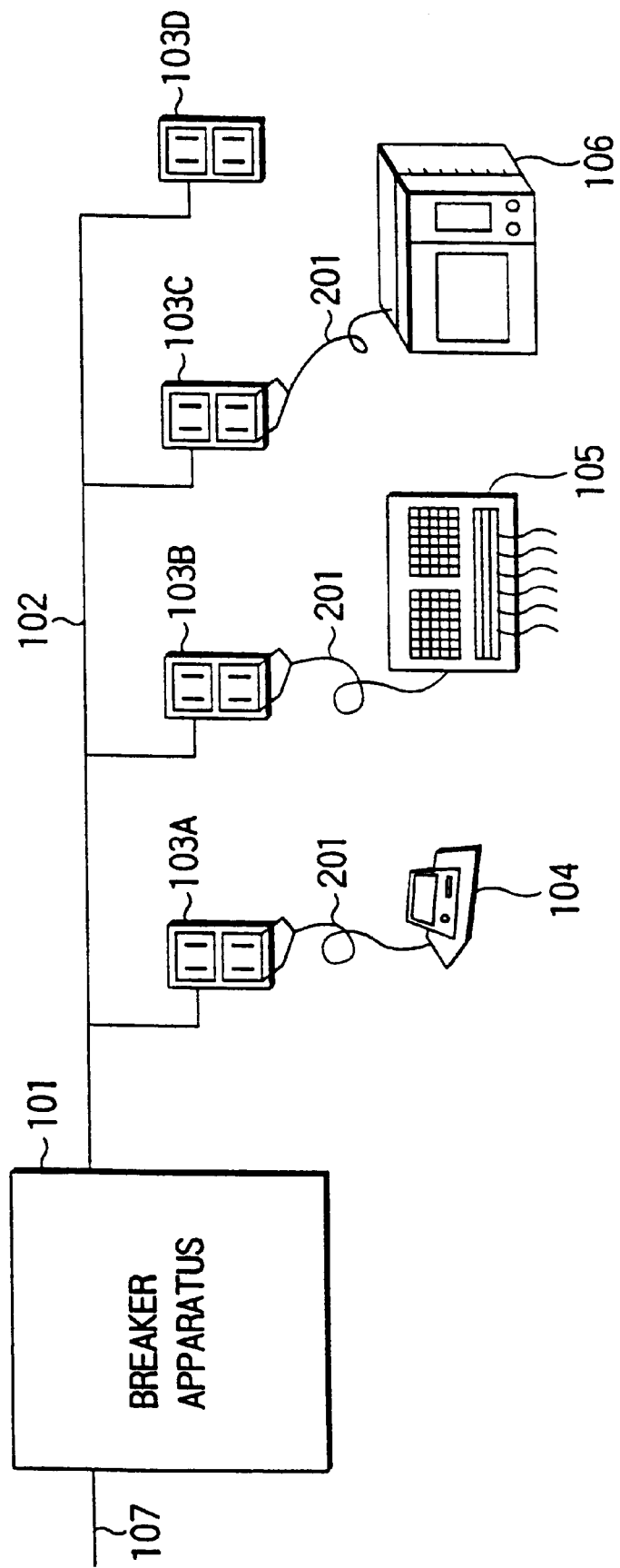
FIG. 1 shows a structure of an entire power supply control system according to a first embodiment of the present invention.

FIG. 1 shows an example of the entire structure of a power supply control system according to a first embodiment of the present invention. This power supply control system constitutes a communication network comprising a power line network for supplying power to electric apparatuses provided within a private area or a residence. In the following description, it is supposed that the power supply control system is constructed within the residence.

The power supply control system shown in FIG. 1 comprises a circuit breaker apparatus (hereinafter referred to as "breaker apparatus") 101, a power line 102, outlets 103A to 103D, electric apparatuses (e.g. iron 104, air-conditioner 105, electronic oven 106), and an external power line 107.

The breaker apparatus 101 is connected between the external power line 107 from an electric power company and the power line 102 within the residence. The breaker apparatus 107 monitors the power consumption within the residence so that it may not exceed a predetermined value. If the power consumption exceeds the predetermined value, the breaker apparatus 101 performs the functions of stopping the power supply, keeping a log of power consumption, and executing specific processes, determination and notification in response to power use permission requests from the electric apparatuses connected to the power line network.

The power line 102 supplies power to each electric apparatus. Digital data is transmitted among the electric apparatuses connected to the power line 102, with the power line 102 used as media.

The outlets 103A to 103D are connected to the power line 102, and power is supplied to the household electric apparatuses via the outlets 103A to 103D. The outlets 103A to 103D serve also as input/output (I/O) ports of data to/from the power line 102.

FIG. 1 shows, as examples of electric apparatuses, the iron 104, air-conditioner 105 and electronic oven 106; however, the electric apparatuses are not limited to these.

The external power line 107 connects the electric power company (i.e. a substation of the electric power company) and the residence. The electric apparatuses within the residence receive power from the electric power company over the external power line 107.

Figure 2:
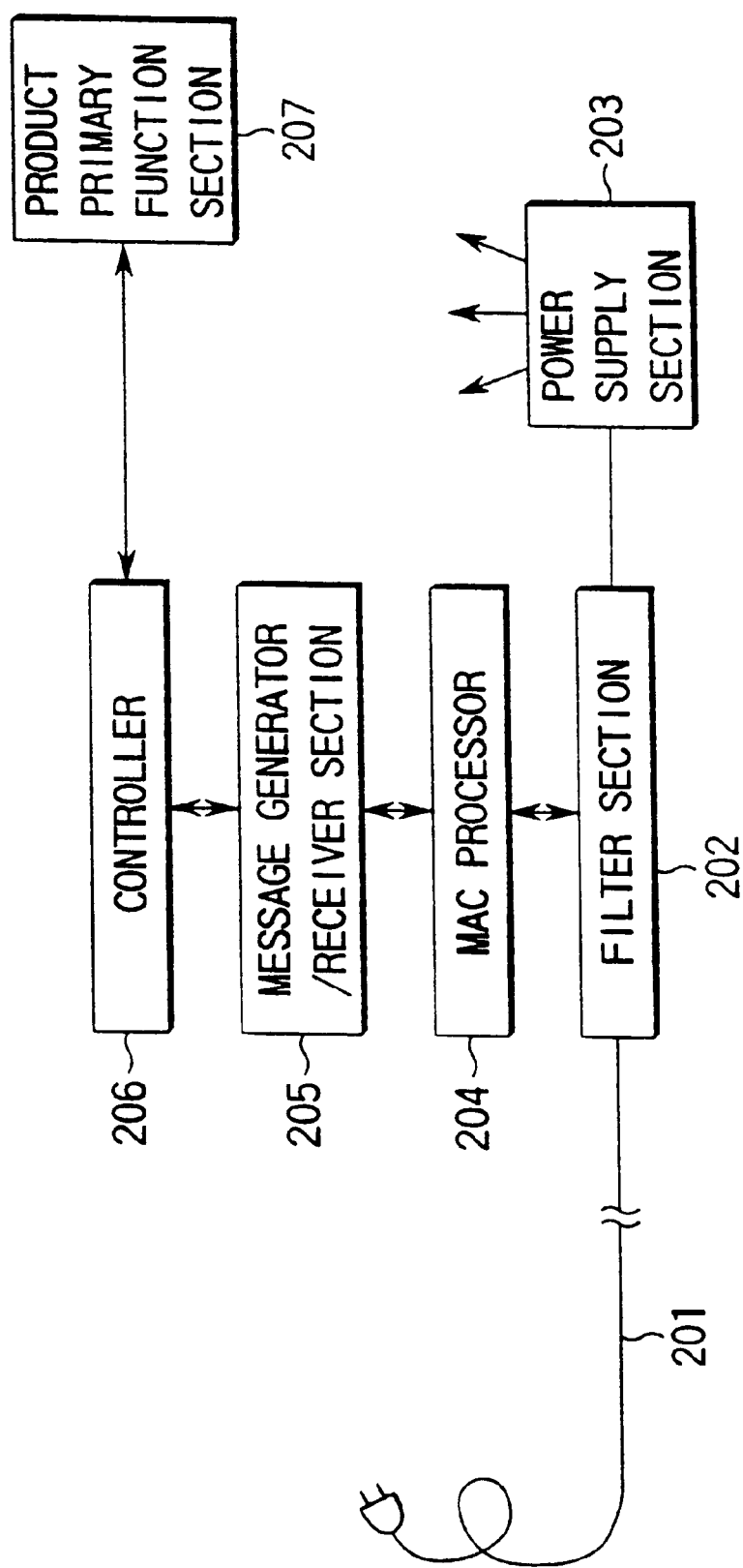
FIG. 2 schematically shows a main part of the internal structure of an electric apparatus.

FIG. 2 shows a main part of the general internal structure of the electric apparatus, such as iron 104, air-conditioner 105 or electronic oven 106, connected to the power line 102 via the associated one of outlets 103A to 103D. As is shown in FIG. 2, the electric apparatus comprises a power cable 201, a filter section 202, a power supply section 203, an MAC processor section 204, a message generator/receiver section 205, a controller 206 and a product primary function section 207.

When any one of the outlets 103A to 103D is connected to one end of the power line 201, power is supplied to the associated electric apparatus via the power line 201. The power cable 201 serves also as data transmission communication media.

The filter section 202 extracts a data signal component from a signal transmitted over the power line 102 and power cable 201, and delivers the data signal component to the MAC processor 204 and also delivers a message from the MAC processor 204 to the power line 201 (or the power line network).

The power supply section 203 supplies power from the power line 201 to the respective structural components of the electric apparatus.

The MAC processor 204 controls and processes the transmission/reception of the message in accordance with the MAC (Media Access Control) system of the power line network connected to the electric apparatus.

The message generator/receiver section 205 generates a message to be sent to the power line network in accordance with an instruction from the controller 206, and delivers the message to the MAC processor 204. When the message generator/receiver section 205 has received a message from the power line network via the MAC processor 204, the generator/receiver section 205 delivers the message to the controller 206.

The controller 206 controls the entire electric apparatus. In particular, the controller 206 performs a communication control in the state in which the electric apparatus is connected to the power line network.

The product primary function section 207 achieves main functions of the product or the electric apparatus (an electric heating function and a press function pressing function in the case of the iron 104; heating/cooling functions or sensor function in the case of air-conditioner 105; a heating function and a timer function in the case of electronic oven 106).

Figure 3:
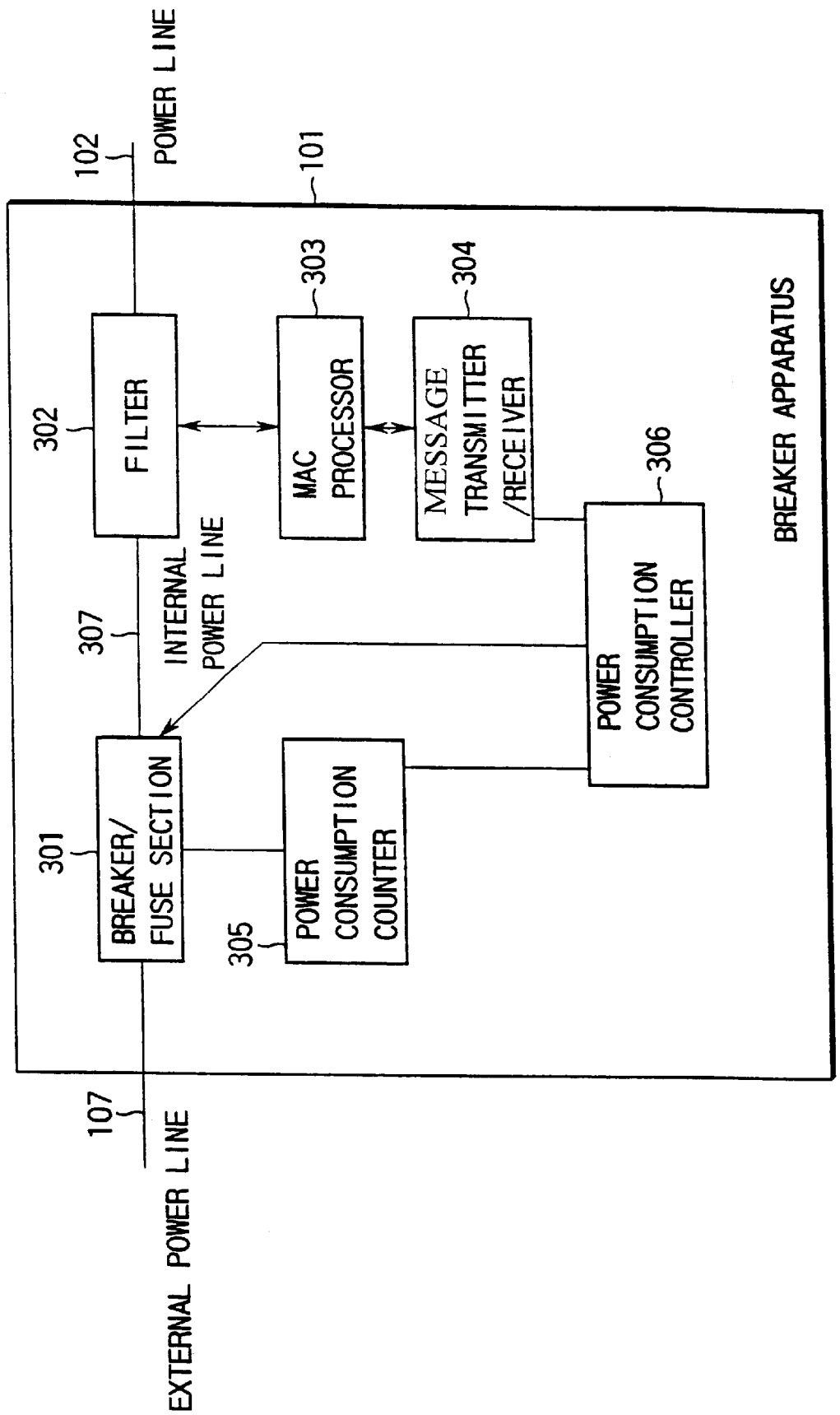
FIG. 3 schematically shows an example of an internal structure of a breaker apparatus.

FIG. 3 shows an example of the structure of the breaker apparatus 101. As is shown in FIG. 3, the breaker apparatus 101 comprises a breaker/fuse section 301, a filter 302, an MAC processor 303, a message transmitter/receiver 304, a power consumption counter 305, a power consumption controller 306, and an internal power line 307.

The breaker fuse section 301 is connected between the external power line 107 and internal power line 307. When power consumed via the power line 102 has exceeded a predetermined value, the breaker fuse section 301 cuts off the flow of power between the external power line 107 and power line 102 so as to stop power supply to the power line 102. In the present invention, the method of cutting off the flow of power is not limited. For example, the flow of power may be mechanically cut off by using a material (so-called "fuse") which is melted when an electric current exceeding a predetermined level has flown. Alternatively, power supply may be stopped in software by a "forcible power supply stop command" delivered from the power consumption controller 306 over a control line.

The filter 302 serves to relay power transmission between the internal power line 307 and power line 102. The filter 302 also extracts a message data signal component from a signal received over the power line 102 (or the power line network) and delivers the extracted signal component to the MAC processor 303. In addition, the filter 302 delivers a message from the MAC processor 303 to the power line 102 (or the power line network).

The message transmitter/receiver 304 generates a message to be transmitted to the power line 102 in accordance with an instruction from the power consumption controller 306, and delivers the generated message to the MAC processor 303. When the message transmitter/receiver 304 has received a message via the power line 102 and MAC processor 303, it delivers the received message to the power consumption controller 306.

The power consumption counter 305 monitors the breaker/fuse section 301 and constantly measures the total power presently consumed via the power line 102. The power consumption counter 305 delivers data on the measured value to the power consumption controller 306.

Upon receiving over the power line 102 a power use permission request from the electric apparatus connected to the power line network, the power consumption controller 306 determines whether the use of power is permitted, on the basis of the data on the present power consumption of the electric apparatus, which is delivered from the power consumption controller 305. The power consumption controller 306 performs a control for transmitting a determination result. The predetermined power consumption of the electric apparatus connected to the power line network may be stored in a specified register provided within the power consumption controller 306.

A first example of the processing operation of the power supply control system shown in FIG. 1 will now be described with reference to FIGS. 4 to 6.

Figure 4:
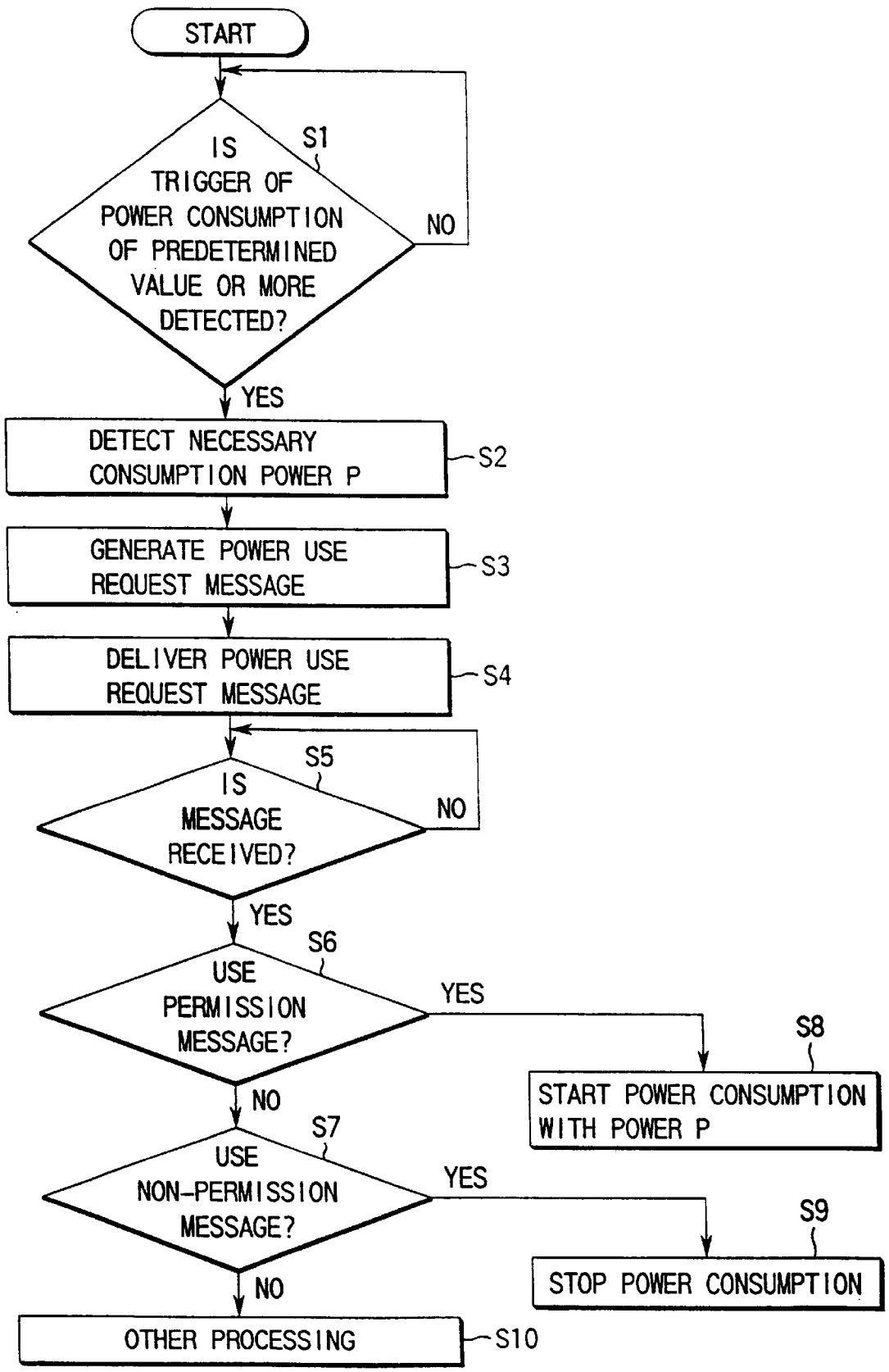
FIG. 4 is a flow chart illustrating a processing operation of an electric apparatus of a processing operation (first example) of the power supply control system shown in FIG. 1.

FIG. 4 is a flow chart illustrating the processing operation of the electric apparatus 104, 105, 106 having the structure shown in FIG. 2.

Suppose that a trigger of power consumption of a predetermined value or more has been detected by the controller 206 of the electric apparatus 104, 105, 106 (step S1). In this context the word "trigger" refers to the turning-on of power or a rise of set temperature in the case of the iron, the turning-on of power or a variation in set temperature in the case of the air-conditioner, or the turning-on of power or the start of emission of internal microwaves in the case of the electronic oven.

The controller 206 then finds a necessary power consumption P corresponding to the type of trigger detected by the controller 206 (step S2). The data on the necessary power consumption P predetermined for each electric apparatus may be stored in a table format in the controller 206, or may be told to the controller 206 by the product primary function section 207. The controller 206 generates a power use request message. The message includes at least a control code indicating the power use request message and data on the necessary power consumption P (step S3). The power use request message is included in, e.g. an IP packet in the message generator/receiver section 205, and is sent to the power line 102 via the MAC processor 204, filter section 202 and power line 201 (step S4). In the IP packet generated by the message generator/receiver section 205, ID information of the electric apparatus (e.g. IP address, production number, or a number obtained from a table of random numbers; the ID information of one electric apparatus being set to be different from that of any of the other electric apparatuses) is set as a transmission-side address. The apparatus (the breaker apparatus 101 in this embodiment), which has received this packet, can determine the electric apparatus which has transmitted the packet, from the transmission-side address included in the packet. In addition, the breaker apparatus can identify the destination of transmission of a response packet.

Figure 6:
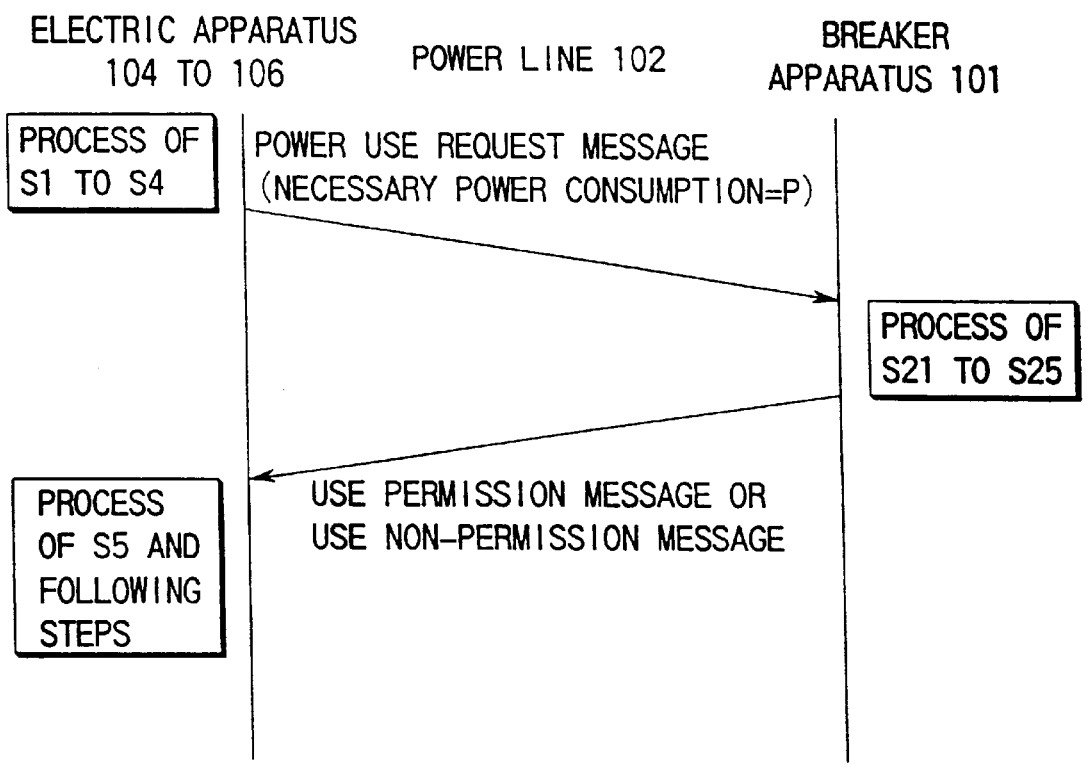
FIG. 6 illustrates a procedure of transmitting messages between the electric apparatus and the breaker apparatus.

The power use request message transmitted from the electric apparatus is sent to the breaker apparatus 101 over the power line 102 as shown in FIG. 6.

Figure 5:
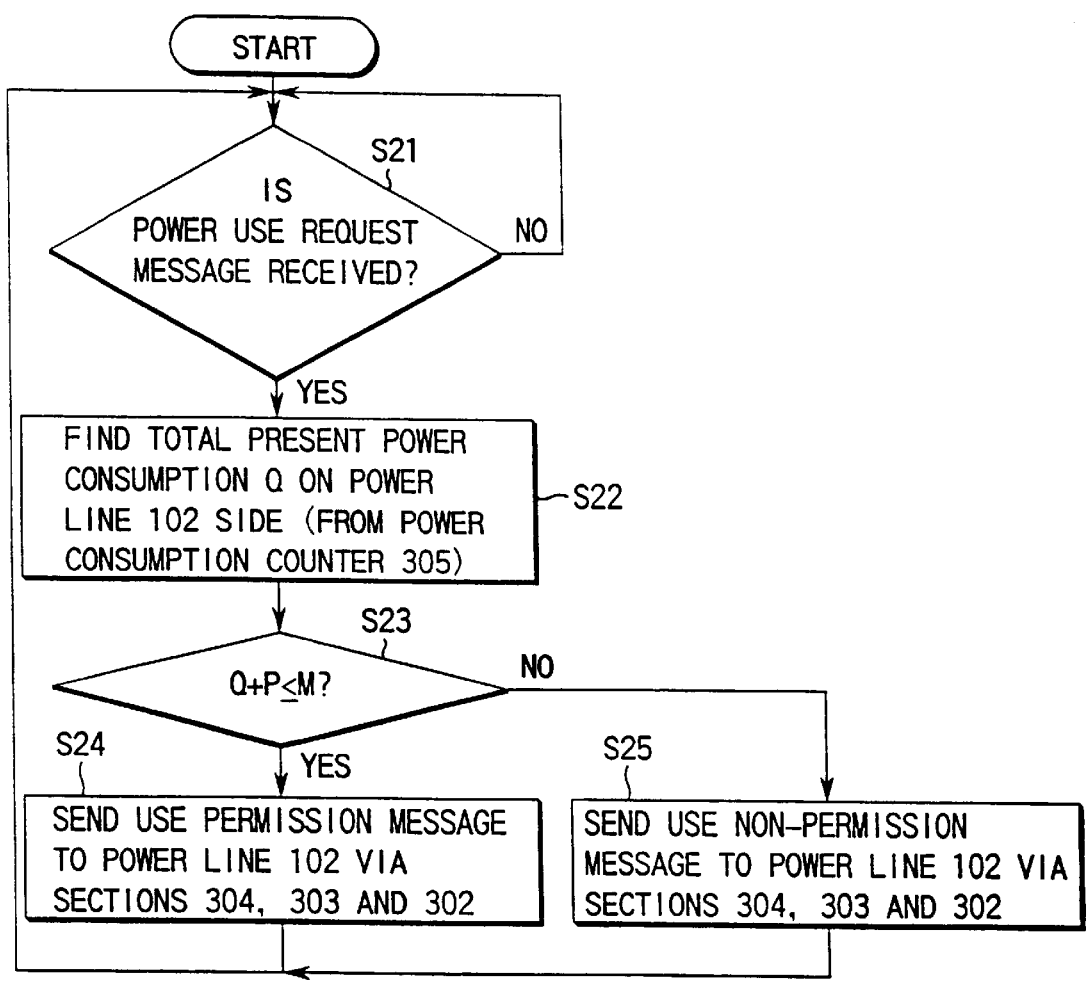
FIG. 5 is a flow chart illustrating a processing operation of a breaker apparatus of a processing operation (first example) of the power supply control system shown in FIG. 1.

FIG. 5 is a flow chart illustrating the processing operation for the message from the electric apparatus in the breaker apparatus 101 constructed as shown in FIG. 3.

The packet containing the power use request message is received via the filter 302, MAC processor 303 and message transmitter/receiver 304 of the breaker apparatus 101. The message transmitter/receiver 304 extracts a message portion from the received packet and outputs the message portion to the power consumption controller 306 (step S21). As has been described above, since the transmission-side address is described in the received packet, the power consumption controller 306 can determine the electric apparatus from which the packet (or the power use request message) has been sent.

Then the power consumption controller 306 inquires of the power consumption counter 305 and obtains, from the power consumption counter 305, data on the total present power consumption Q on the power line 102 side (step S22). The power consumption controller 306 prestores data on a maximum allowable power M set in the breaker apparatus 101 (or breaker fuse 301) and compares the allowable power M with the sum (Q+P) of total present power consumption Q and necessary power consumption P requested by each electric apparatus (step S23). If the maximum allowable power M is greater, the power consumption controller 306 permits use of power by the electric apparatus which has sent the power use request message. The power consumption controller 306 generates a use permission message to the effect that use of power is permitted, and makes it packeted in the message transmitter/receiver 304. The packeted message is sent to the electric apparatus, which has sent the power use request message, via the MAC processor 303, filter 302 and power line 102 (step S24). On the other hand, if the maximum allowable power M is smaller, the power consumption controller 306 rejects the use of power by the electric apparatus which has received the power use request message, and generates a use non-permission message to the effect that the use of power is not permitted. This message is sent to the electric apparatus which has transmitted the power use request message (step S25).

As is shown in FIG. 6, the use permission message or use non-permission message are sent to the electric apparatus 104, 105, 106 via the power line 102. As has been described above, the destination address of the packet containing the use permission message or use non-permission message is the transmission-side address of the power use request message.

The processing operation in the electric apparatus 104, 105, 106 which has received the packet containing the use permission message or use non-permission message will now be described with reference to FIG. 4. The message generator/receiver section 205 of the electric apparatus 104, 105, 106 receives the use permission/non-permission message destined to itself (step S5). Each electric apparatus determines that the message contained in the received packet is destined to itself, when the destination address of the received packet is identical to the transmission-side address added to the transmitted power use request message or when the random number of the received packet is identical to the random number added to the transmitted power use request message (or a number obtained by adding a predetermined known number to the random number added to the transmitted power use request message). Then, the message is analyzed in the controller 206 (steps S6 and S7).

If the received message is the use permission message, the controller 206 recognizes that the use of power P requested by the previously transmitted power use request message is permitted and starts power supply with necessary consumption power P (step S8). On the other hand, if the received message is not the use non-permission message, the controller 206 recognizes that the use of power P requested by the previously transmitted power use request message is not permitted and stops power supply to the electric apparatus (step S9). At this time, an alarm message such as "The use of this apparatus is dangerous since it requires more than an upper-limit power. Turn off power to other apparatus or stop using this apparatus." may be displayed on some other electric apparatus (e.g. the TV set) connected to the currently used electric apparatus, breaker apparatus 101 or power line 102, or may be told to the user by speech. In this case, a proper protocol process for enabling this message to be displayed needs to be performed between the breaker apparatus 101 and the TV set connected to the power line.

When the received message is not the use permission/non-permission message, a predetermined process is executed in accordance with the kind of the received message (step S10).

As has been described above, when the electric apparatus needs to consume power of a desired value, the power use request message is transmitted to the breaker apparatus 101 to request use of power. The breaker apparatus 101, which manages and controls the power consumption of all electric apparatuses connected to the power line 102, permits or rejects the power use request message. The breaker apparatus 101 controls the power consumption so that the consumed power may not exceed a predetermined upper limited. Thereby, so-called switching-off of the circuit breaker is prevented, and malfunction of the electric apparatus due to a sudden switching-off of the circuit breaker (i.e. stop of power supply) can be prevented.

A second example of the processing operation of the power supply control system shown in FIG. 1 will now be described with reference to flow charts of FIGS. 7 and 8.

Figure 7:
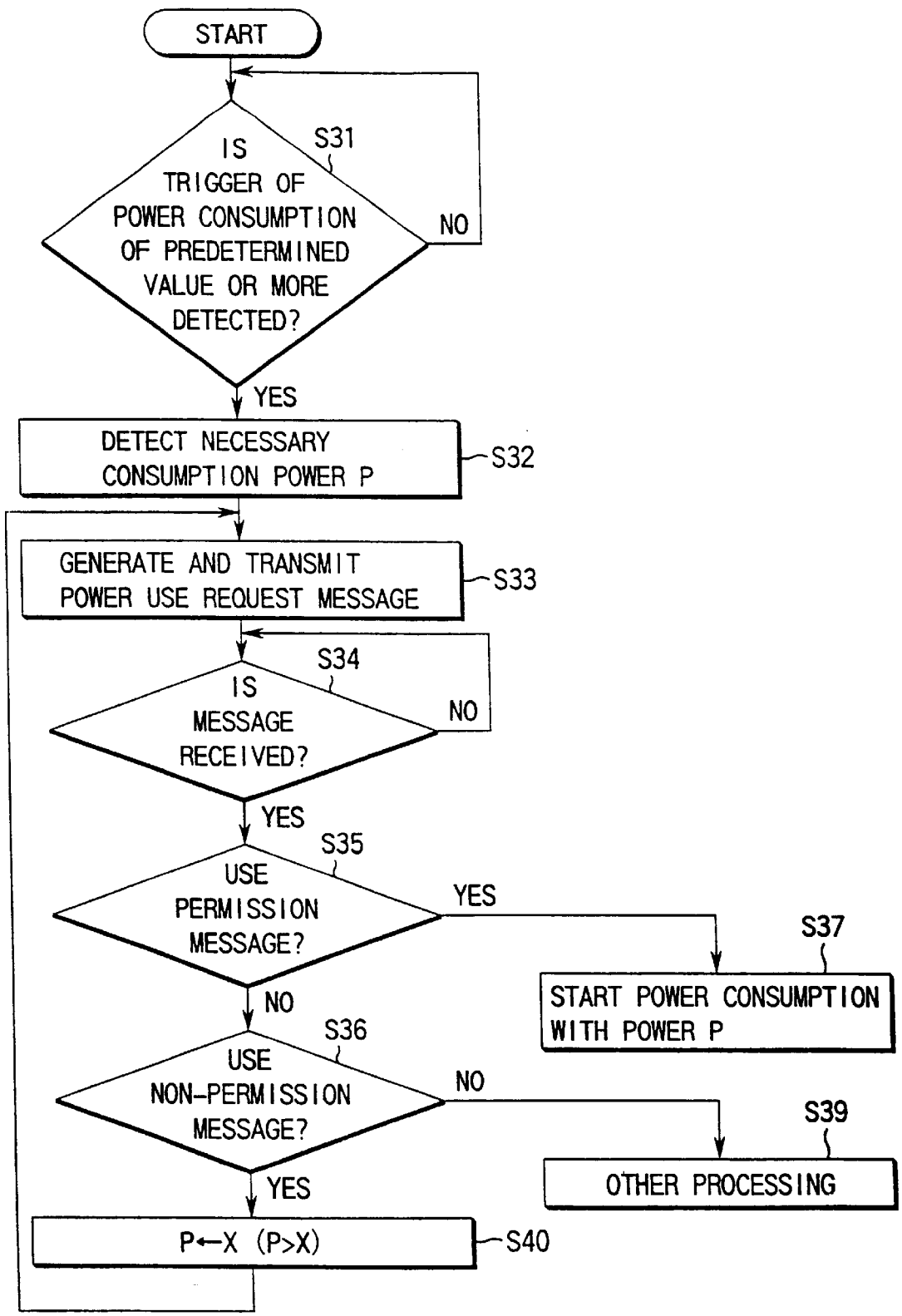
FIG. 7 is a flow chart illustrating a processing operation of an electric apparatus of a processing operation (second example) of the power supply control system shown in FIG. 1.
Figure 8:
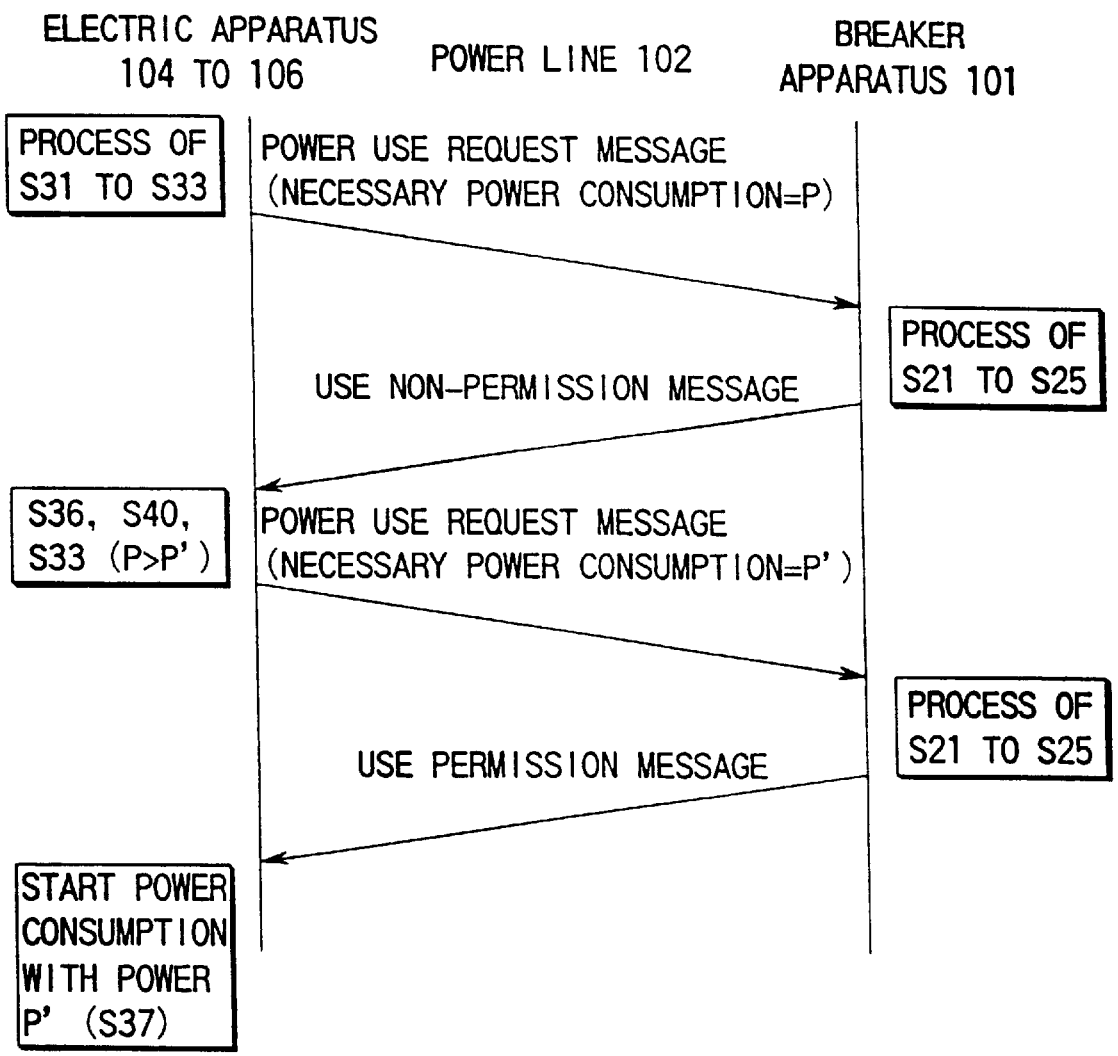
FIG. 8 illustrates a procedure of transmitting messages between the electric apparatus and the breaker apparatus.

FIG. 7 is a flow chart illustrating the processing operation of the electric apparatus 104, 105, 106. Steps S31 to S36 in FIG. 7 correspond substantially to steps S1 to S7 in FIG. 4. Suppose that the electric apparatus 104, 105, 106 has received the use non-permission message. The electric apparatus recognizes that the power, which can be consumed by the power line network, is exceeded by the addition of the necessary power consumption P requested previously. Thus, the previous value of power consumption P is updated to a smaller power consumption P. The updated value is written in the power use request message, and the message is sent to out as a packet (steps S40 and S33).

The electric apparatus, which sends out the power use request message with the updated value of power consumption P, is limited to the one that causes no inconvenience to the user even if the power consumption P is varied. For example, when the air-conditioner is initially set in a "high" mode, the operation mode may be changed to "middle" because of the upper limit of power consumption (the user can still enjoy good air-conditioning). Then, as shown in FIG. 8, the breaker apparatus 101 performs once again such an operation as is illustrated in FIG. 5, and controls the permission/non-permission of the requested power consumption.

The processing loop of steps S33 to S40 in FIG. 7 may be continued until the power consumption value P decreases to a predetermined value, or may be performed only a predetermined number of times.

A third example of the processing operation of the power supply control system shown in FIG. 1 will now be described with reference to FIGS. 9 to 11. In this example, the breaker apparatus 101 receives the power use request message from the electric apparatus and informs the electric apparatus of an available power consumption A.

Figure 9:
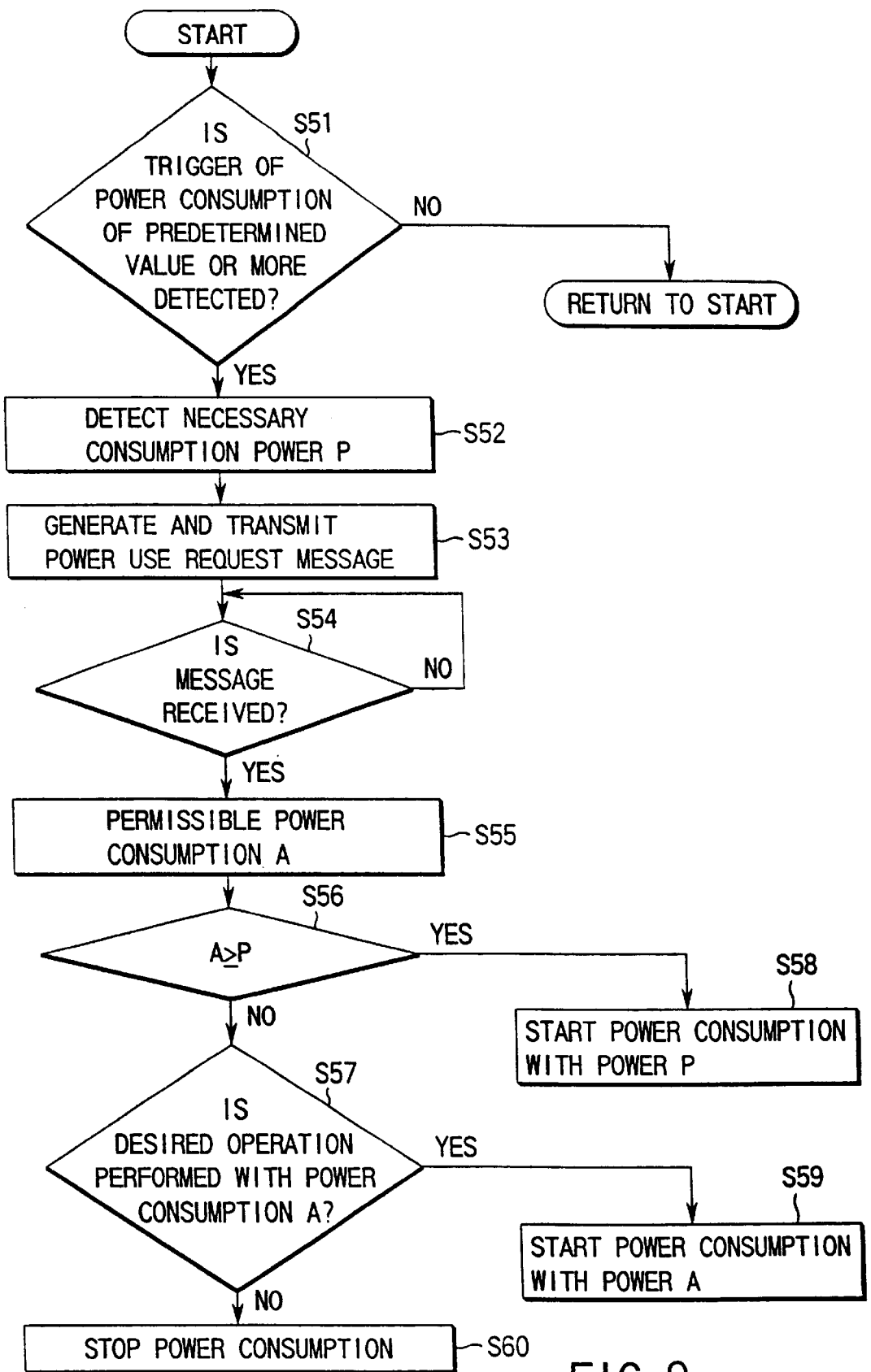
FIG. 9 is a flow chart illustrating a processing operation of an electric apparatus as a processing operation (third example) of the power supply control system shown in FIG. 1.

FIG. 9 is a flow chart illustrating the processing operation of the electric apparatus 104, 105, 106. The processing for generating and transmitting the power use request message from step S51 to S53 in FIG. 9 are basically the same as that in steps S1 to S3 in FIG. 4 As is shown in FIG. 11, the power use request message transmitted from the electric apparatus is sent to the breaker apparatus 101 over the power line 102, and the breaker apparatus 101 starts processing.

Figure 10:
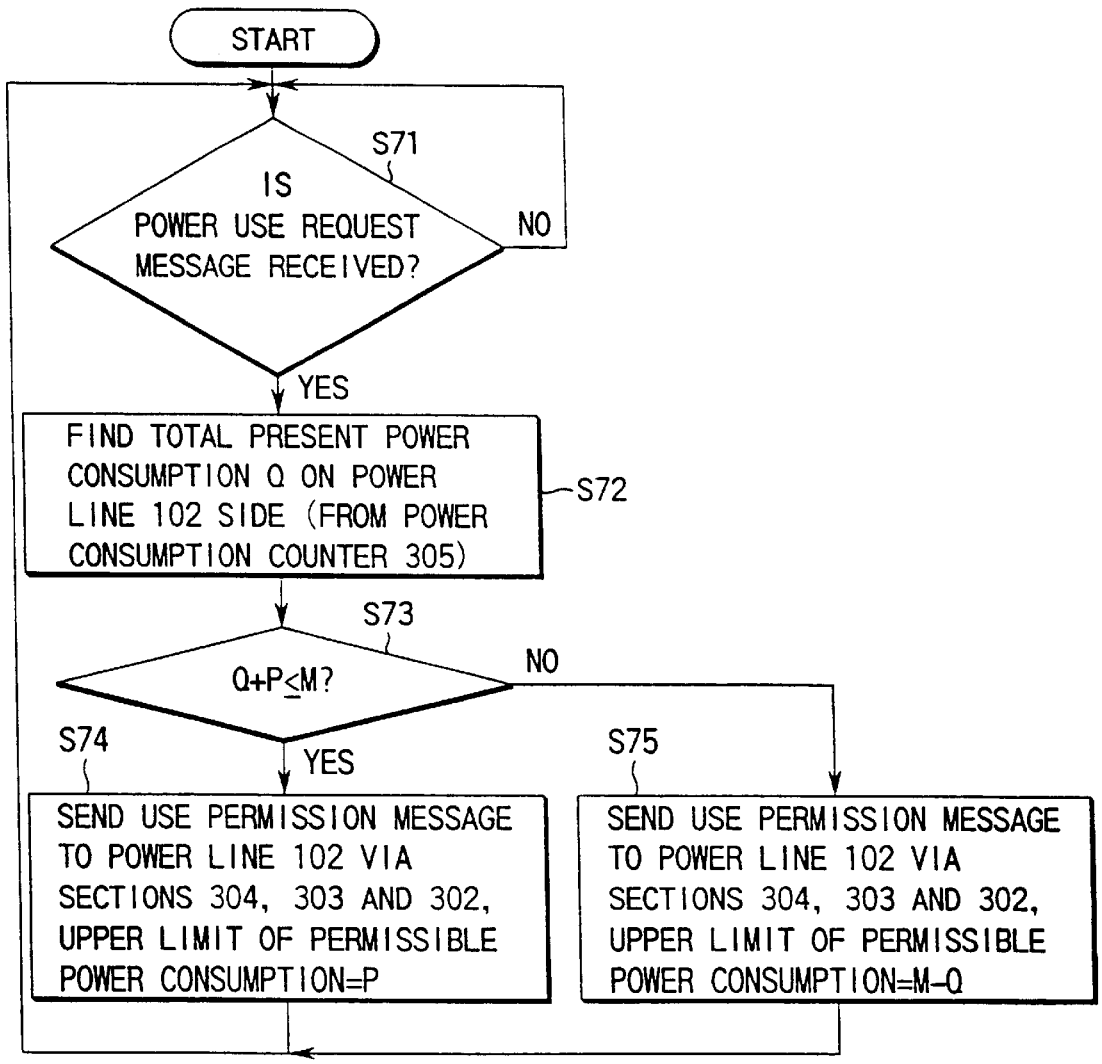
FIG. 10 is a flow chart illustrating a processing operation of a breaker apparatus as a processing operation (third example) of the power supply control system shown in FIG. 1.

FIG. 10 is a flow chart illustrating the processing operation of the breaker apparatus 101. The process from the reception of the power use request message to the transmission of the use permission message in steps S71 to S74 in FIG. 10 is basically the same as the process in steps S21 to S24 in FIG. 5. The process in FIG. 10 is characterized by step S74 in which the value of permissible power consumption A for the electric apparatus (in this case, necessary power consumption P requested by the electric apparatus) is described in the use permission message and the message is sent to the electric apparatus 104, 105, 106.

On the other hand, when the sum (Q+P) of the total power consumption Q up to now and the necessary power consumption P requested by the electric apparatus is greater than the maximum permissible power M, that is, when the maximum permissible power M is exceeded if the necessary consumption power P requested by the electric apparatus is supplied, the breaker apparatus 101 selects the maximum permissible power consumption (M−Q) at that time as the value of permissible consumption power A, describes this value in the use permission message, and informs the electric apparatus 104, 105, 106 of the use permission message (step S75).

Figure 11:
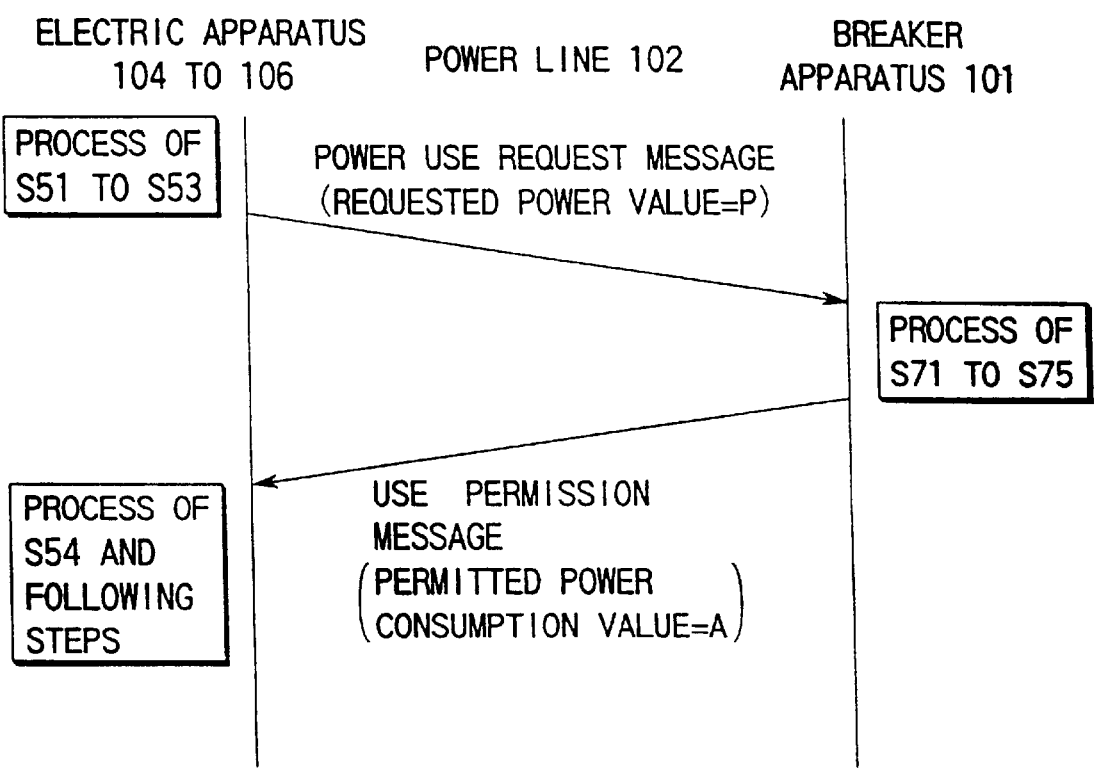
FIG. 11 illustrates a procedure of transmitting messages between the electric apparatus and the breaker apparatus.

As is shown in FIG. 11, when the breaker apparatus 101 has received the power use request message describing the necessary consumption power P from the electric apparatus 104, 105, 106, the breaker apparatus 101 performs the process of steps S71 to S75 in FIG. 10 and transmits the use permission message describing the permissible consumption power A to the electric apparatus which has sent the power use request message.

The electric apparatus, which has received the use permission message describing the permissible use power A, determines whether it can operate with the permissible use power A described in the use permission message (steps S55 to S56). If the permissible use power A is equal to the requested power P, the electric apparatus begins power consumption of permissible use power A with no problem (step S58). Even in the case where the permissible use power A is less than the requested power P, if power consumption of the permissible use power A is significant (e.g. the operation mode of the air-conditioner can be switched from "High" to "Medium"), the electric apparatus begins power consumption of permissible use power A (step S59). On the other hand, if it is determined that the power consumption of permissible use power A has no significance, the power consumption is stopped (step S60).

As has been described above, according to the power supply control system shown in FIG. 1, power is supplied to the electric apparatus connected to the power line 102, and the power supplied via the power line 102 is constantly controlled to be less than a predetermined upper-limit value (maximum permissible power M). In addition, power can be distributed to electric apparatuses with high efficiency.

(Second Embodiment)

In the power supply control system of the first embodiment, the power line 102 and power cable 201 are used as signal transmission media to supply power to the electric apparatuses provided within the private area or the residence. However, message transmission between the electric apparatus 104, 105, 106 and the breaker apparatus 101 may be effected through a communication medium other than the power line 102 and power cable 201.

In a power supply control system according to a second embodiment of the present invention, messages are transmitted, like the first embodiment. In this case, however, messages are transmitted through a wireless communication network or a communication medium different from the power line network, such as power line 102 and power cable 201, for supplying power.

Figure 12:
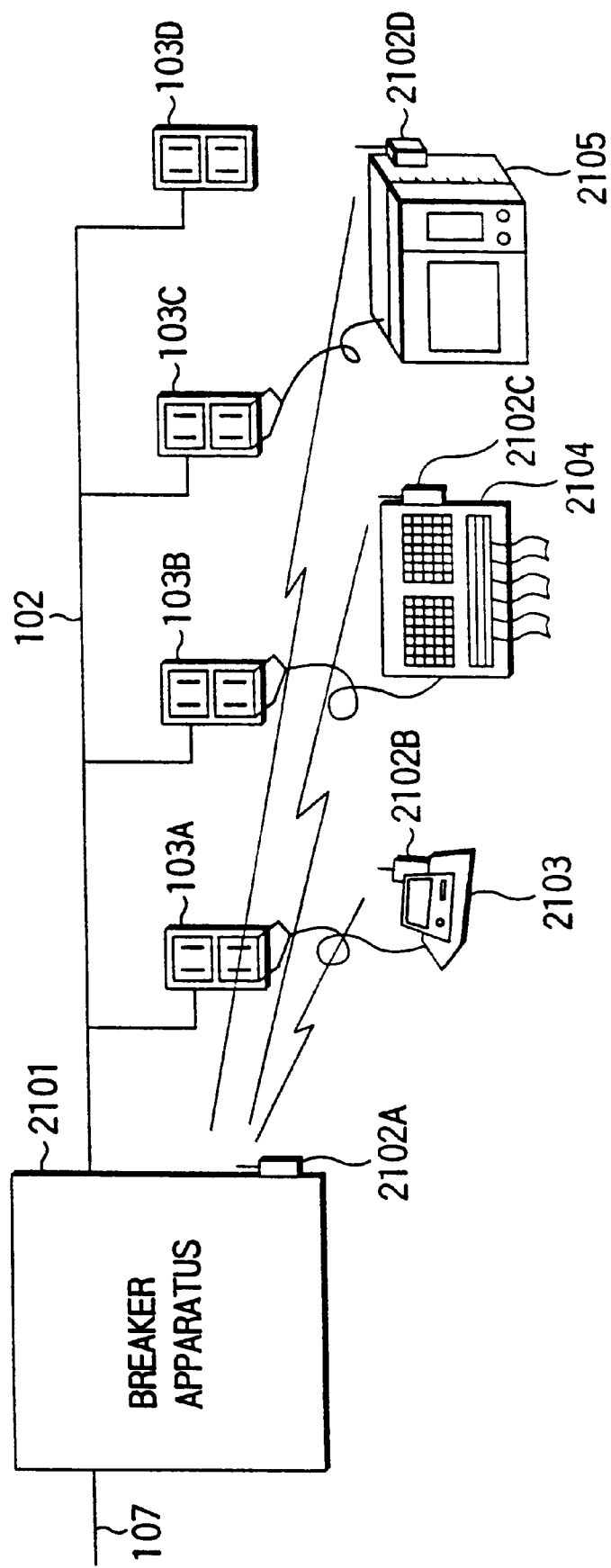
FIG. 12 schematically shows a structure of an entire power supply control system according to a second embodiment of the present invention.

FIG. 12 shows an example of the structure of the power supply control system according to the second embodiment. This system comprises a breaker apparatus 2101, a power line 102, outlets 103A to 103D, electric apparatuses (iron 2103, air-conditioner 2104 and electronic oven 2105), an external power line 107, and wireless devices 2102A to 2102D provided in the electric apparatuses and breaker apparatus. This system constitutes a power line network for supplying power and a wireless communication network.

As regards the power line network and wireless communication network, portions different from the structure of FIG. 1 will now be described.

Figure 13:
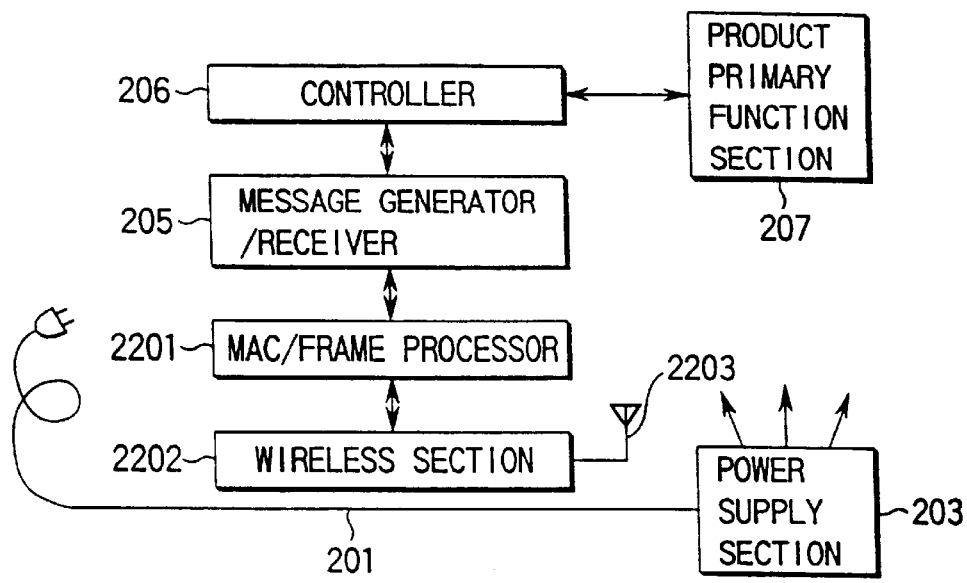
FIG. 13 schematically shows the internal structure of an electric apparatus in FIG. 12.

FIG. 13 shows a main part of the general internal structure of electric apparatuses, such as iron 2103, air-conditioner 2104 and electronic oven 2105, connected to the power line 102 via the outlets 103A to 103D. As is shown in FIG. 13, the electric apparatus comprises a power cable 201, a power supply section 203, an MAC/frame processor 2201, a wireless section 2202, an antenna 2203, a message generator/receiver 205, a controller 206, and a product primary function section 207. In FIG. 13, the structural elements common to those in FIG. 2 are denoted by like reference numerals, and the same description applies to the basic functions thereof.

The wireless section 2202 and antenna 2203 receive a radio signal and demodulate the received radio carrier wave. Thus, a wirelessly transmitted data signal is obtained and delivered to the MAC/frame processor 2201. Besides, the wireless section 2202 modulates a radio carrier wave with use of a data signal from the MAC/frame processor 2201, and the modulated radio signal is transmitted from the antenna 2203.

The MAC/frame processor 2201 controls access to a wireless medium from the electric apparatus. For example, the MAC/frame processor 2201 transmits/receives packet data by using a random access method or transmits/receives a frame by using a TDMA method. Specifically, in the MAC/frame processor 2201, a message generated by the message generator/receiver 205 is contained in the aforementioned packet or frame. The packet or frame with the message is sent to the wireless section 2202. On the other hand, the MAC/frame processor 2201 extracts a packet or a frame from the signal supplied from the wireless section 2202, and delivers a message contained in the packet or frame to the message generator/receiver 205.

Figure 14:
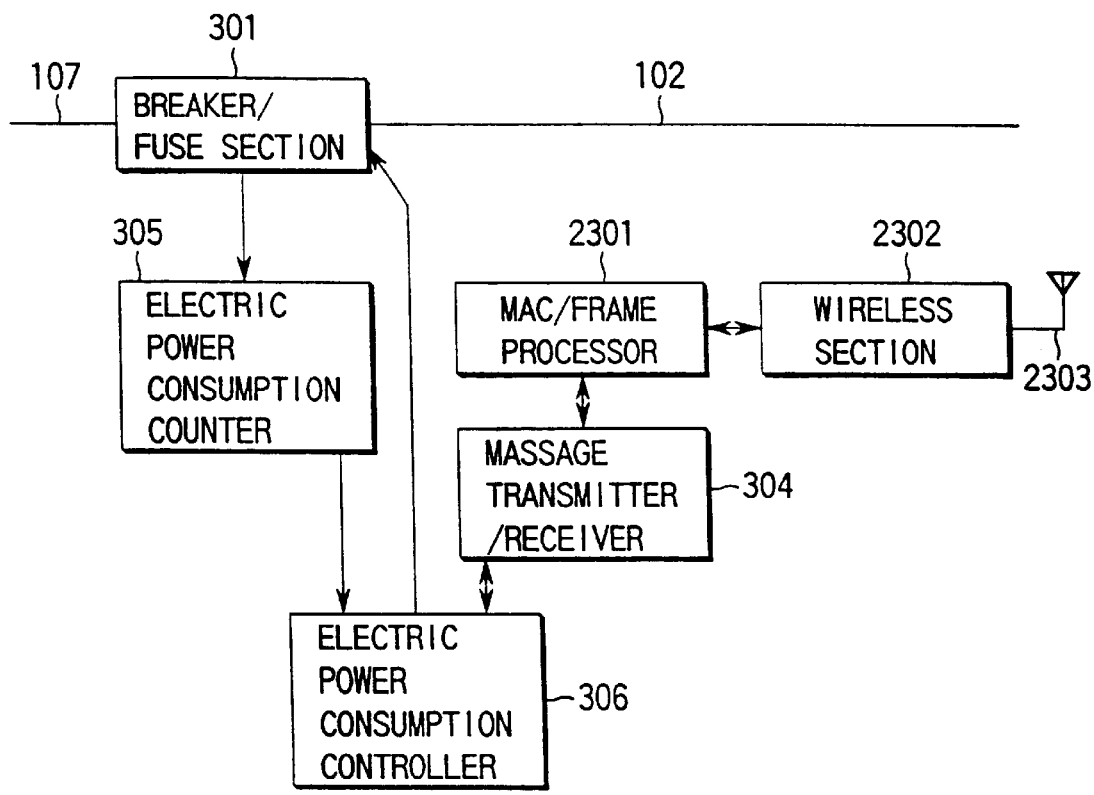
FIG. 14 schematically shows an example of an internal structure of a breaker apparatus in FIG. 12.

FIG. 14 shows the structure of the breaker apparatus 210. As is shown in FIG. 14, the breaker apparatus 2101 comprises a breaker/fuse section 301, an MAC/frame processor 2301, a wireless section 2302, an antenna 2303, a message transmitter/receiver 304, an electric power consumption controller 306. In FIG. 14, the structural elements common to those in FIG. 3 are denoted by like reference numerals, and a description thereof is omitted.

The wireless section 2302 and antenna 2303 receive a radio signal and demodulate the received radio carrier wave. Thus, a wirelessly transmitted data signal is obtained and delivered to the MAC/frame processor 2301. Besides, the wireless section 2302 modulates a radio carrier wave with use of a data signal from the MAC/frame processor 2301, and the modulated radio signal is transmitted from the antenna 2303.

The MAC/frame processor 2301 controls access to a wireless medium from the breaker apparatus 2101. For example, the MAC/frame processor 2301 transmits/receives packet data by using a random access method or transmits/ receives a frame by using a TDMA method. Specifically, in the MAC/frame processor 2301, a message generated by the message generator/receiver 304 is contained in the aforementioned packet or frame. The packet or frame with the message is sent to the wireless section 2302. On the other hand, the MAC/frame processor 2301 extracts a packet or a frame from the signal supplied from the wireless section 2302, and delivers a message contained in the packet or frame to the message transmitter/receiver 304.

The processing operation of the power supply control system constructed as shown in FIG. 12 is the same as that in the first embodiment. A communication network to be used for transmitting messages between the electric apparatus 2103, 2104, 2105 and the breaker apparatus 2101 may be, for example, a data transmission network of the PHS (Personal Handy Phone System) which has recently been widely used for speech calls, or a simplified radio data transmission network used for POS (Point of Sales) systems.

If such a data transmission network is applied to the communication network for transmitting messages between the electric apparatus 2103, 2104, 2105 and the breaker apparatus 2101, the communication network can be used not only for transmitting messages for controlling power supply, but also for other purposes, for example, by performing data communication among the electric apparatuses.

In the above description, the wireless communication network is used as communication network for transmitting messages for power supply control between the electric apparatus 2103, 2104, 2105 and the breaker apparatus 2101. However, for example, a data transmission network using ATM (Asynchronous Transfer Mode) or a conventional LAN may be used. For example, a TV set, a personal computer, a multimedia terminal, etc., provided in the residence, may be connected and a domestic LAN for communication of multimedia information can be used. The electric apparatuses 2103 to 2105 and the breaker apparatus 2101 may be mutually connected by means of IEEE 1394 so that power is supplied over the power line 102 while data is transmitted over IEEE 1394. In this case, the wireless section 2202 in the structure of the electric apparatus shown in FIG. 13 and the wireless section 2302 in the structure of the breaker apparatus 2101 shown in FIG. 14 are replaced with an IEEE 1394 interface unit for performing an IEEE 1394 protocol process.

In such a domestic LAN (home network), a wide-band, low-delay transmission suitable for communication of multimedia information can be achieved. Therefore, a quick control for power supply can be performed.

(Third Embodiment)

In the power supply control system according to the first embodiment, the sections for determining the permission/non-permission of use of power by the electric apparatus connected to the power line network are provided within the breaker apparatus 101. The present invention, however, is not limited to this technique. In a power supply control system according to a third embodiment of the invention, the sections for determining the permission/non-permission of use of power by the electric apparatus connected to the power line network are provided in an apparatus (a management apparatus) different from the breaker apparatus.

Figure 15:
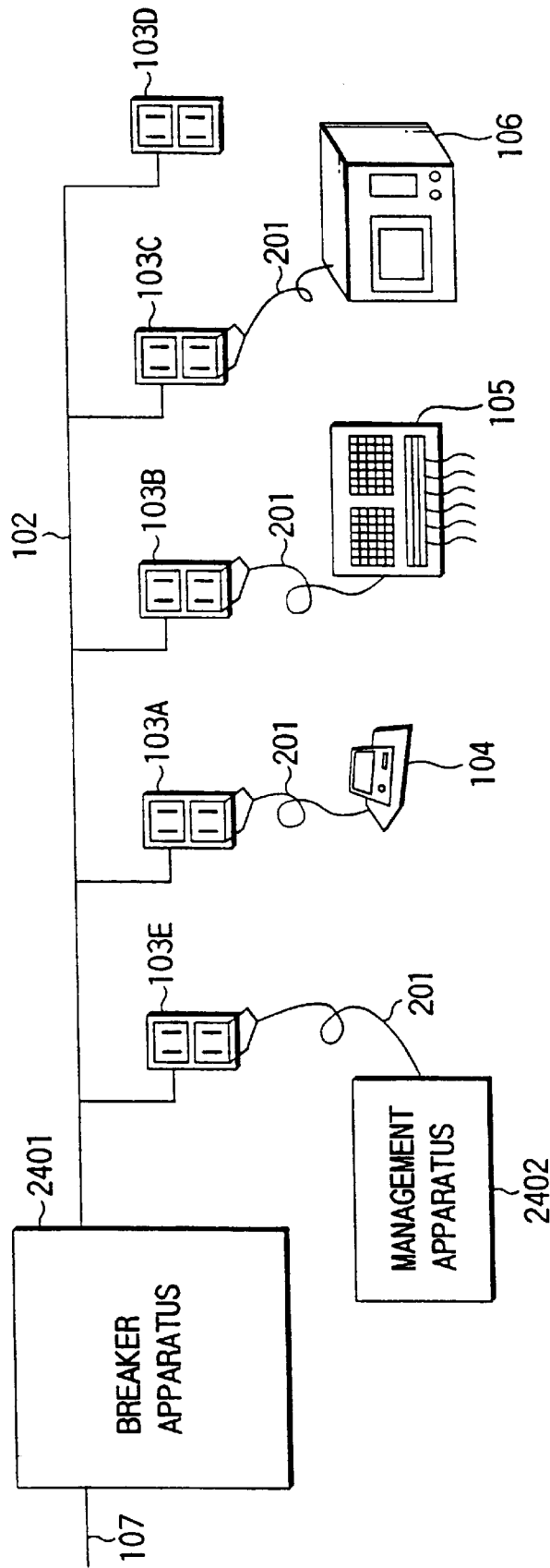
FIG. 15 schematically shows a structure of an entire power supply control system according to a third embodiment of the present invention.

FIG. 15 shows an example of the structure of the power supply control system according to the third embodiment of the invention. Like the first embodiment, the power line 102 and power cables 201 are used to supply power to the electric apparatuses provided within the private area or residence, and are used as a data signal transmission medium. As is shown in FIG. 15, the power supply control system comprises a breaker apparatus 2401, a power line 102, outlets 103A to 103D, electric apparatuses (e.g. iron 104, air-conditioner 105 and electronic oven 106), and an external power line 107. In FIG. 15, the structural elements common to those in FIG. 1 are denoted by like reference numerals, and a description thereof is omitted. The power supply control system shown in FIG. 15 differs from that shown in FIG. 1 in that 1) the breaker apparatus 2401 is provided between the external power line 107 from the electric power company and the power line 102 or power supply line within the residence and has only a "circuit breaker" function, i.e. a function of monitoring the power consumption within the residence so that it may not exceed a predetermined value and stopping the power supply it the power consumption has exceeded the predetermined value, and 2) a management apparatus 2402 comprising the sections for determining the permission/non-permission of use of power by the electric apparatuses connected to the power line network is connected to one (outlet 103E) of the outlets connected to the power line 102.

Figure 16:
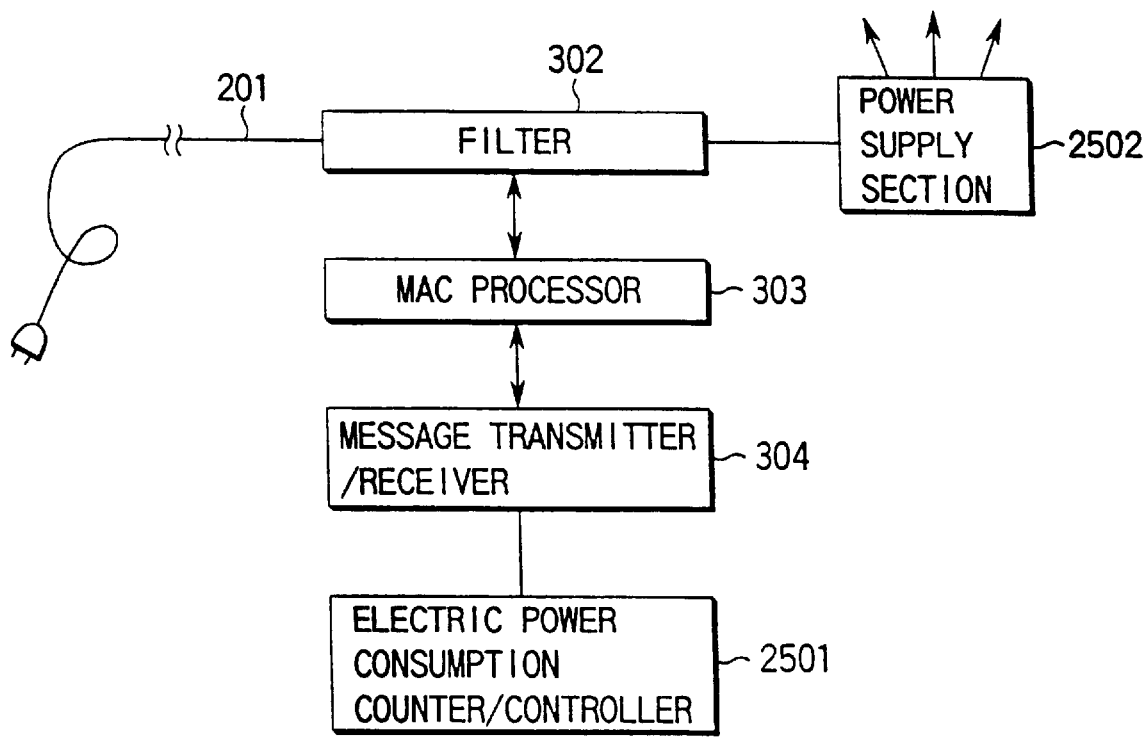
FIG. 16 schematically shows an example of the internal structure of a management apparatus shown in FIG. 15.

FIG. 16 shows an example of the internal structure of the management apparatus 2402. As is shown in FIG. 16, the management apparatus 2402 comprises a power line 201, a filter 302, an MAC processor 303, a message transmitter/receiver 304, an electric power consumption counter/controller 2501 and a power supply system 2502. When one end of the power line 201 is connected to any one of the outlets 103A to 103E, power is supplied to the management apparatus 2402. The power line 201 serves also as a data transmission medium for transmitting messages by using the functions of the MAC processor 303, message transmitter/receiver 304 and electric power consumption counter/controller 2501.

The power supply system 2502 supplies power from the power line 201 to the respective parts of the management apparatus 2402.

The description of the breaker apparatus 101 shown in FIG. 3 applies to the MAC processor 303 and message transmitter/receiver 304.

The electric power consumption counter/controller 2501 directly measures a current, etc. flowing in the power line 102, and monitors the present total power consumption, etc. In addition, the electric power consumption counter/controller 2501 receives, via the power line 102 and power cable 201, a power use permission request, determines permission/non-permission of the request, and issues a result of the determination. It should be noted that the electric power consumption counter/controller 2501 may retain messages transmitted via the power line 102 and power cable 201 from each electric apparatus connected to the power line 102, or data on currently consumed power received by wireless transmission, thereby to monitor the total power consumption of the entire power line network.

The processing operation of the power supply control system constructed as shown in FIG. 15 is the same as that in the first embodiment.

According to the third embodiment, the power supply control can be performed only by using the conventional breaker apparatus and connecting the management apparatus 2402 to the outlet connected to the power line 102.

(Fourth Embodiment)

When an electric current greater than a predetermined level has flown, the conventional breaker apparatus cuts off the power supply circuit connected to the power line within the residence in order to stop the supply of electric current. This function of the conventional breaker apparatus aims at 1) preventing an accident, such as a fire from the power line, due to overcurrent, and 2) protecting the power supply equipment of the electric company and other users of electric power when some user of power fails to keep a maximum power consumption decided by a contract between the user and the electric company.

Figure 17:
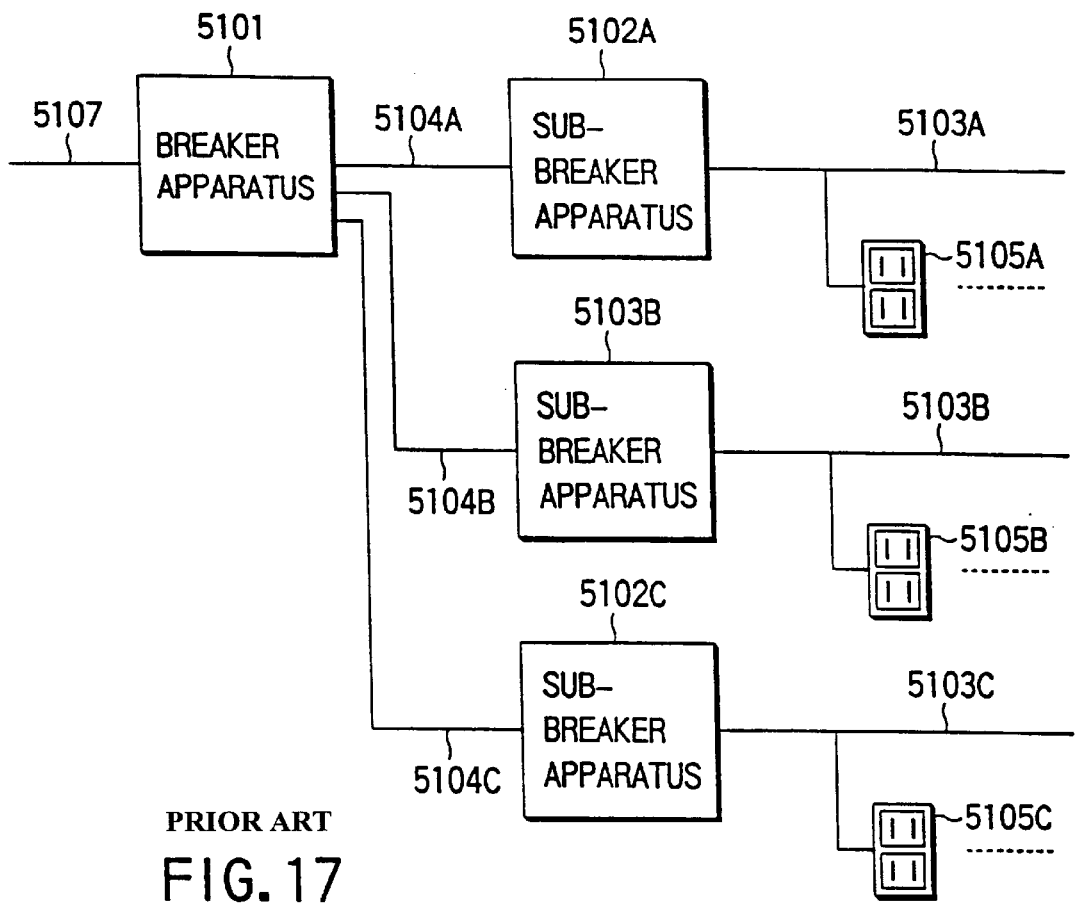
FIG. 17 shows an example of the structure of a conventional power supply network, wherein electric apparatuses are hierarchically connected to the breaker apparatus.

For these purposes, there is known a conventional structure of hierarchical connection of breaker apparatuses, as shown in FIG. 17. Specifically, as shown in FIG. 17, a breaker apparatus 5101 is connected to a plurality of sub-breaker apparatuses 5102A to 5102C via distribution lines 5104A to 5104C. Power lines 5103A to 5103C are connected to the respective sub-breakers 5102A to 5102C.

Each of the sub-breaker apparatuses 5102A to 5102C is equipped with a breaker/fuse section which cuts off a power supply circuit connected to the power line, 5103A, 5103B, 5103C, if a current greater than a value allowable to the power line connected to the sub-breaker apparatus has flown.

Figure 18:
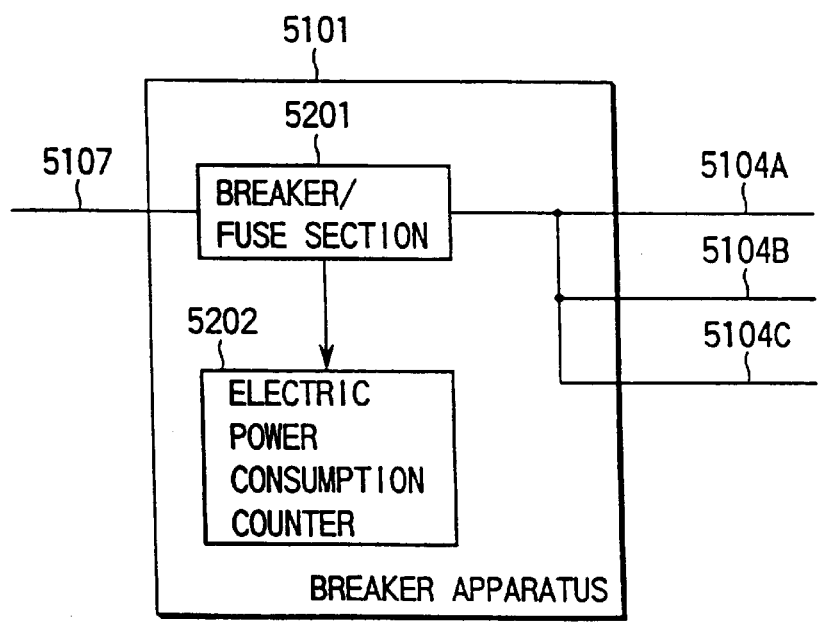
FIG. 18 schematically shows an example of the structure of a conventional breaker apparatus.

FIG. 18 shows an example of the structure of the breaker apparatus 5101. The breaker apparatus 5101 comprises a breaker/fuse section 5201 and an electric power consumption counter 5202. The breaker/fuse section 5201 is connected to distribution lines 5104A to 5104C. The electric power consumption counter 5202 measures the total amount of power consumed over the distribution lines 5104A to 5104C and calculates an electricity rate. When the sum of currents flowing in the distribution lines 5104A to 5104C has exceeded a predetermined value, the breaker/fuse section 5201 cuts off power supply circuits connected to the distribution lines 5104A to 5104C. This predetermined value is decided by a contract between the power user and the electric power company. In general, the predetermined value set in the breaker apparatus 5101 is less than the sum of values of currents permitted in the sub-breakers 5102A to 5102C. Thus, even if the electric apparatus is used within the range of current values permitted in each of distribution lines 5104A to 5104C, the total power used in the distribution lines 5104A to 5104C may exceed the predetermined value decided by the contract and set in the breaker apparatus 5101, with the result that the power supply circuit is cut off. The power supply control system according to the fourth embodiment has been devised to solve the above problem.

Figure 19:
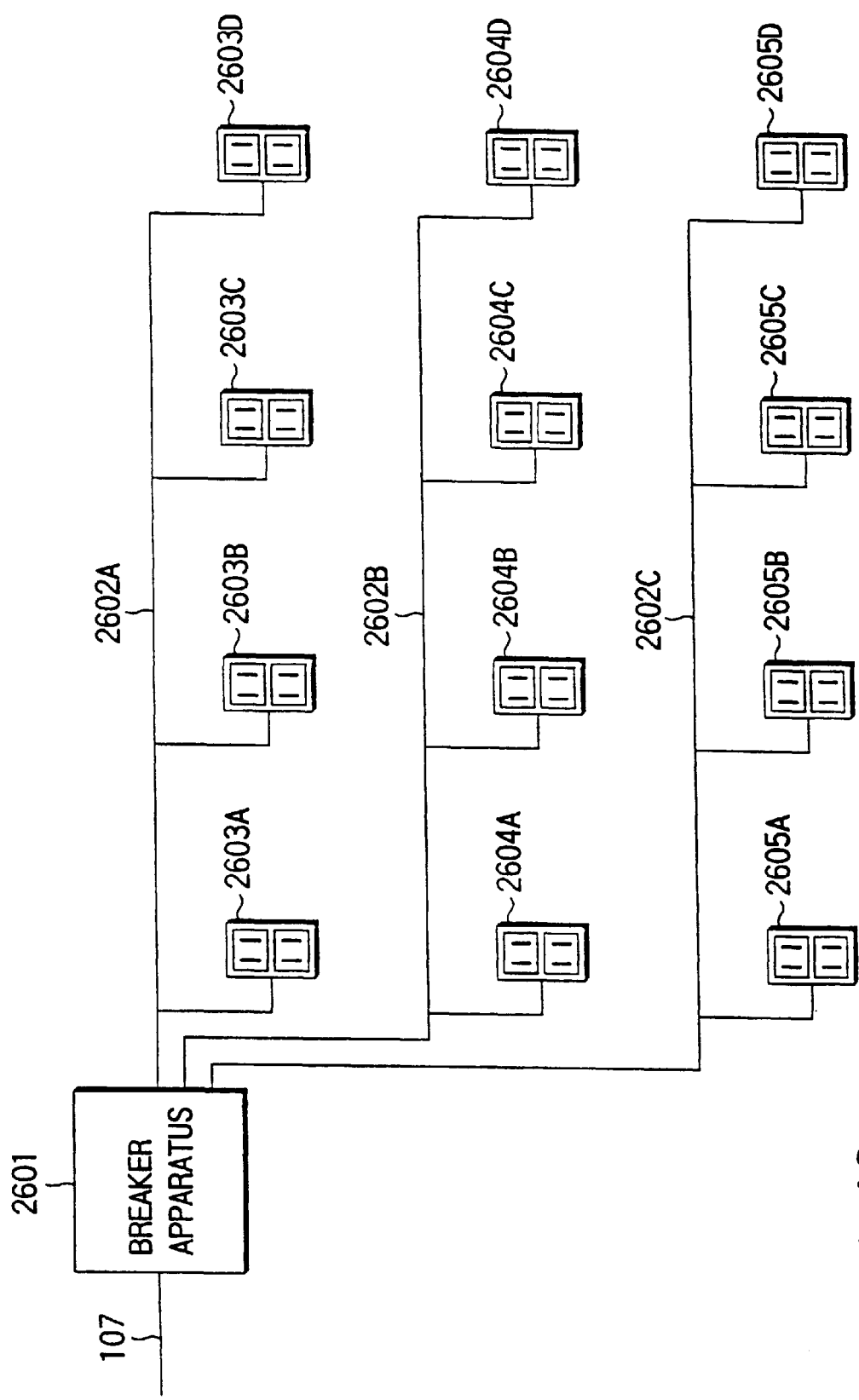
FIG. 19 schematically shows a structure of a power supply control system according to a fourth embodiment of the present invention.

The power supply control system shown in FIG. 19 comprises a breaker apparatus 2601, a plurality of power lines 2602A to 2602C, outlets 2603A to 2603D, 2604A to 2604D and 2605A to 2605D connected to the power lines 2602A to 2602C, and an external power line 107. The external power line 107 is the same as that shown in FIG. 1.

Figure 20:
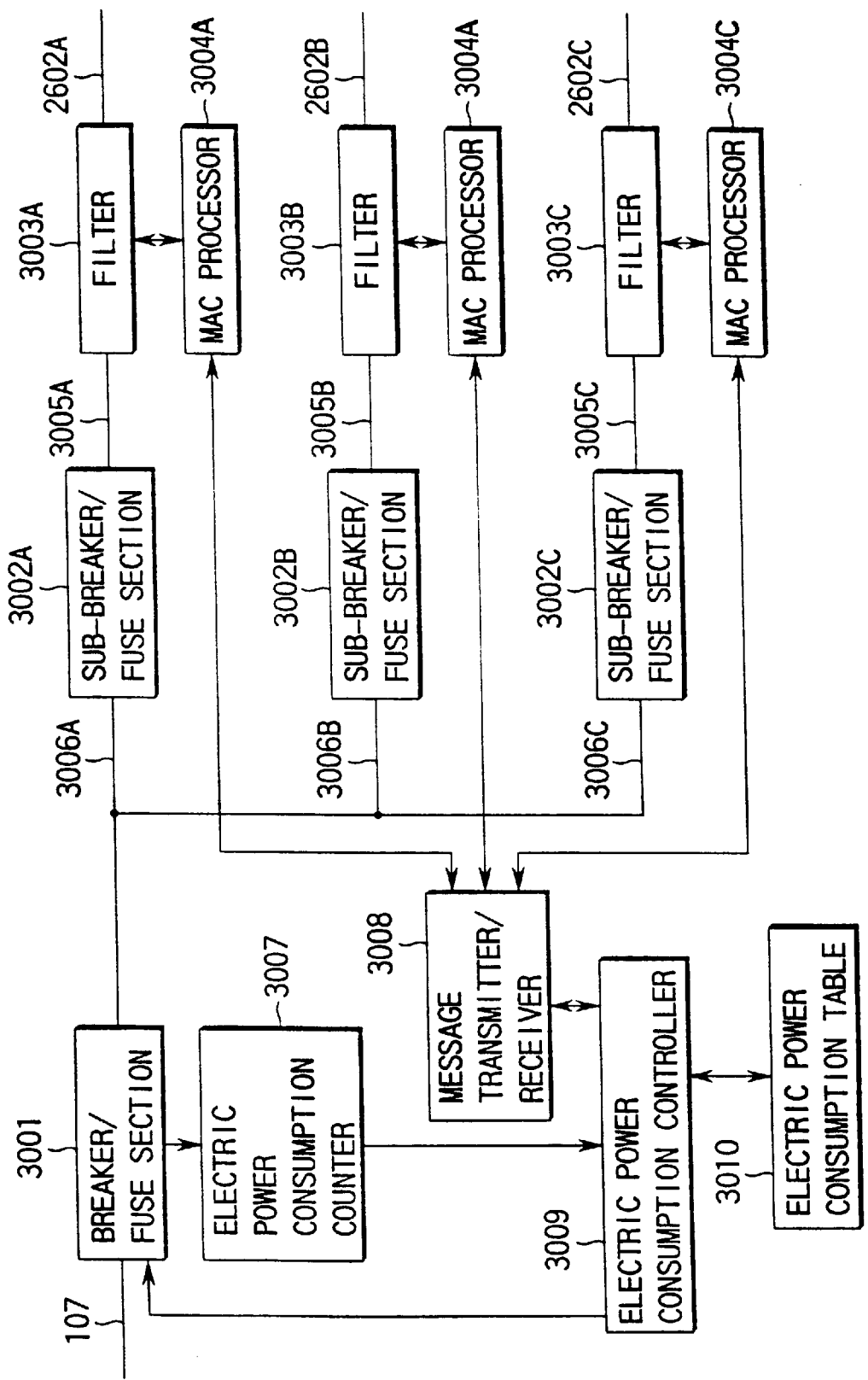
FIG. 20 schematically shows an example of an internal structure of a breaker apparatus in FIG. 19.

FIG. 20 shows an example of the structure of the breaker apparatus 2601 shown in FIG. 19. The breaker apparatus 2601 mainly comprises a breaker/fuse section 3001, sub-breaker/fuse sections 3002A to 3002C, filters 3003A to 3003C, MAC processors 3004A to 3004C, internal power lines 3005A to 3005C, distribution lines 3006A to 3006C, an electric power consumption counter 3007, a message transmitter/receiver 3008, and an electric power consumption controller 3009.

The breaker/fuse section 3001 is connected between the external power line 107 and the distribution lines 3006A to 3006C. When the total power consumed over the power lines 2602A to 2602C has exceeded a predetermined value, the breaker/fuse section 3001 cuts off the flow of current between the external power line and distribution lines in order to stop power supply to the power lines 2602A to 2602C. A maximum power consumption value M is set in the breaker/fuse section 3001 so that the total power consumed in the electric apparatuses connected to the power lines 2602A to 2602C may not exceed a power consumption decided by a contract with the electric power company.

The sub-breaker/fuse sections 3002A to 3002C are connected, respectively, between the distribution lines 3006A to 3006C and the internal power lines 3005A to 3005C. When the power consumed over each of the power lines 2602A to 2602C has exceeded a predetermined value, each of the sub-breaker/fuse sections 3002A to 3002C cuts off the flow of current between the associated distribution line and internal power line in order to stop power supply to the associated power line. A maximum power consumption value m is set in each of the sub-breaker/fuse section 3002A to 3002C in order to prevent a fault or an accident from occurring due to overcurrent flowing in the power lines 2602A to 2602C.

The filters 3003A to 3003C are connected, respectively, between the internal power lines 3005A to 3005C and the power lines 2602A to 2602C in order to relay power transmission. The filters 3003A to 3003C extract message data signal components from signals received via the power lines 2602A to 2602C and send them to the MAC processors 3004A to 3004C. In addition, the filters 3003A to 3003C send messages, received from the MAC processors 3004A to 3004C, to the power lines 2602A to 2602C.

The MAC processors 3004A to 3004C perform a message transmission control according to a method matching with the MAC method of the power line network.

The message transmitter/receiver 3008 generates messages to be sent to the power lines 2602A to 2602C, according to an instruction from the electric power consumption controller 3009, and delivers the generated messages to the MAC processors 3004A to 3004C. In addition, when the message transmitter/receiver 3008 has received a message from any one of the power lines 2602A to 2602C via the associated MAC processor, 3004A, 3004B, 3004C, the message transmitter/receiver 3008 adds to the received message an identifier for identifying the power line to which the message-sending side electric apparatus is connected. The message with the identifier is output to the electric power consumption controller 3009.

The electric power consumption counter 3007 monitors the breaker/fuse section 3001, measures constantly the present total power consumed over the power lines 2602A to 2602C, and informs the electric power consumption controller 3009 of the measured value.

The electric power consumption table 3010 stores, in a table format associated with the power lines 2602A to 2602C, data on present consumption powers of the electric apparatuses connected to the power lines 2602A to 2602C. When the electric power consumption controller 3009 has permitted the use of power in response to the power use request message from the electric apparatus, the value of power consumption permitted to the electric apparatus is written on the electric power consumption table 3010.

The electric power consumption controller 3009 receives the power use permission request sent from the power lines 2602A to 2602C, determines whether the request is permissible, and sends out the determination result, on the basis of the data on the present total power consumption provided from the electric power consumption counter 3007 as well as the data on the electric power consumption table 3010 relating to the power consumed currently by the electric apparatus connected to each of the power lines 2602A to 2602C.

The processing operation of the electric apparatus connected to the power line network shown in FIG. 19 is the same as that illustrated in FIG. 4.

Figure 21:
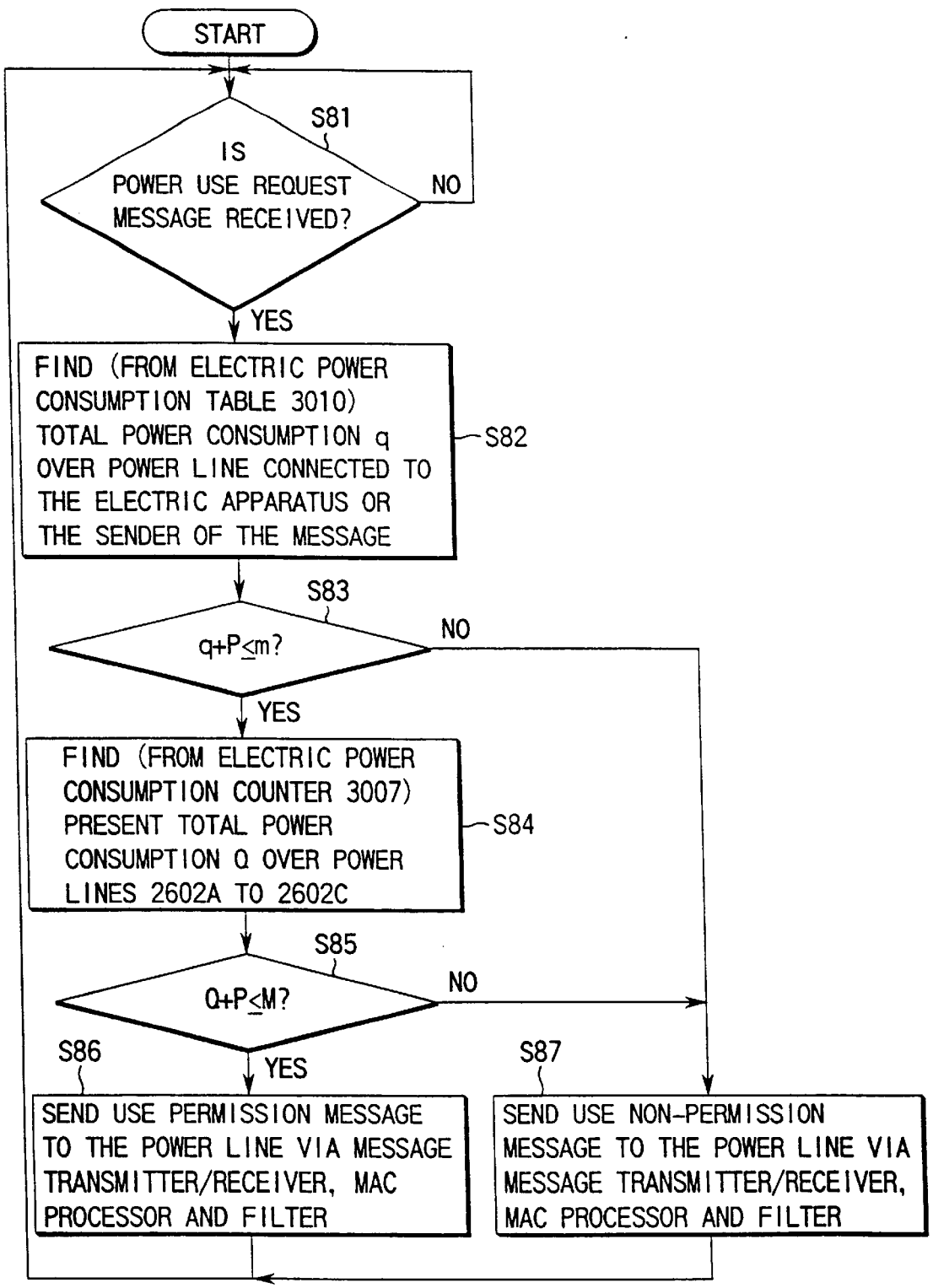
FIG. 21 is a flow chart illustrating a processing operation of the breaker apparatus.

The processing operation of the breaker apparatus 2601 will now be described with reference to the flow chart of FIG. 21 and the sequence of FIG. 22. For example, the packet containing the power use request message, transmitted from the electric apparatus connected to the power line 2602A shown in FIG. 19 is received by the message transmitter/receiver 3008 via the power line 2602A, filter 3003A, and MAC processor 3004A. The message transmitter/receiver 3008 extracts the message from the received packet and outputs the message to the electric power consumption controller 3009 (step S81). As has been described above, since the sending-side address is added to the received packet, the electric power consumption controller 3009 can determine that the packet (or the power use request message) has been sent from the electric apparatus connected to the power line 2602A.

The electric power consumption controller 3009 calculates, by referring to the electric power consumption table 3010, a present total power consumption q over the power line 2602A connected to the electric apparatus which has transmitted the power use request message (step S82).

The electric power consumption controller 3009 recognizes the maximum permissible power m set in each of the sub-breaker fuse sections 3002A to 3002C. The controller 3009 compares the sum (q+P) of the present total power consumption q over the power line 2602A connected to the electric apparatus, which has transmitted the power use request message, and the necessary consumption power P described in the power use request message, with the maximum permissible power m set in the sub-breaker fuse section 3002A connected to the power line 2602A to which the electric apparatus or the sender of the power use request message is connected.

If the value m is smaller, the consumable power is deficient. Thus, the electric power consumption controller 3009 generates a use non-permission message indicating the rejection of the power use request, makes the message packeted in the message transmitter/receiver 3008, and sends the packeted message to the electric apparatus, or the sender of the power use request message, via the MAC processor 3004A, filter 3003A and power line 2602A (step S87).

On the other hand, if the value m is greater, the electric power consumption controller 3009 obtains, from the electric power consumption counter 3007, the data on the present total power consumption Q over the power lines 2602A to 2602C (i.e. the sum of power consumptions over the power lines 2602A to 2602C) (step S84). The controller 3009 stores the data on the maximum permissible power M set in the breaker/fuse section 3001 of breaker apparatus 2601. The controller 3009 compares the sum (Q+P) of the present total power consumption Q over power lines 2602A to 2602C and the necessary consumption power P described in the power use request message, with the maximum permissible power M set in the breaker/fuse section 3001 (step S85). If the value M is greater, the consumable power in the power line network has a margin. Thus, the electric power consumption controller 3009 generates a use non-permission message indicating the permission of the power use request, makes the message packeted in the message transmitter/receiver 3008, and sends the packeted message to the electric apparatus, or the sender of the power use request message, via the MAC processor 3004A, filter 3003A and power line 2602A (step S86). If the value M is smaller, the consumable power in the power line network has no margin. Thus, the electric power consumption controller 3009 generates a use non-permission message indicating the rejection of the power use request, makes the message packeted in the message transmitter/receiver 3008, and sends the packeted message to the electric apparatus, or the sender of the power use request message, via the MAC processor 3004A, filter 3003A and power line 2602A (step S87).

Figure 22:
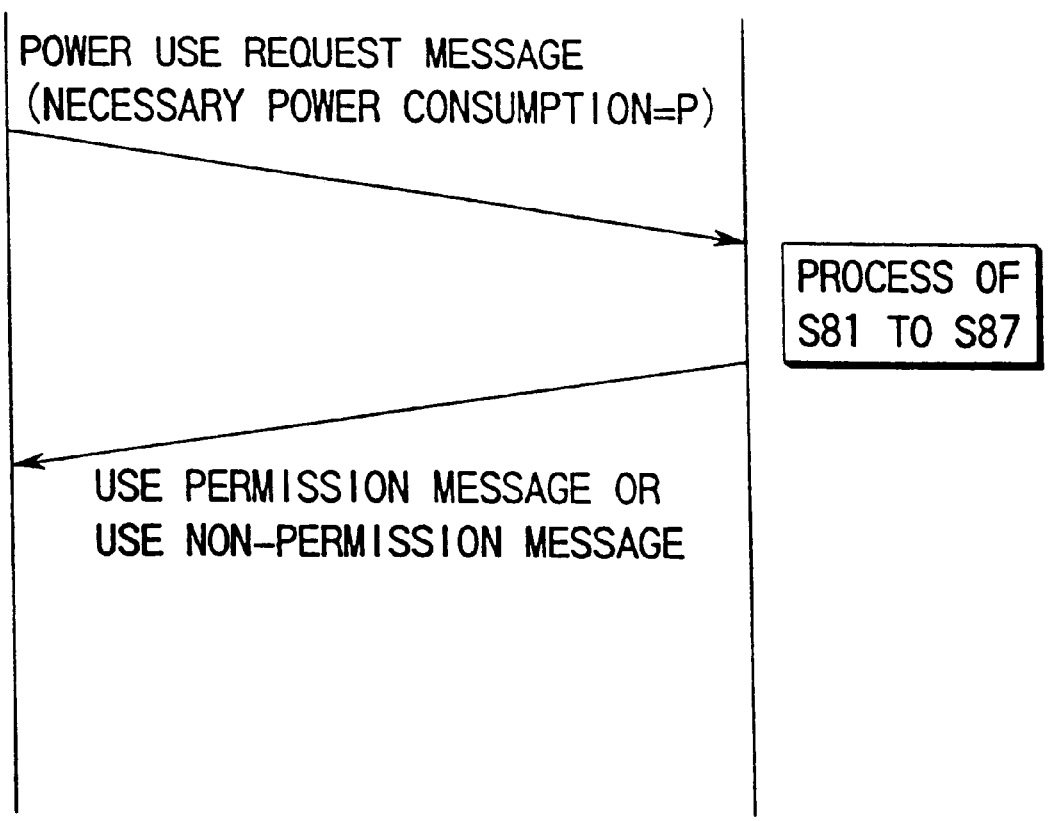
FIG. 22 illustrates a procedure of transmitting messages between the electric apparatus and the breaker apparatus.

As is shown in FIG. 22, the power use request message is sent to the breaker apparatus 2601 from the electric apparatus via the power line 2602A. Then, the breaker apparatus 2601 sends back to the electric apparatus via the power line 2602A the use permission/non-permission message, to which the address of the electric apparatus or the sender of the power use request message that is added to the power use request message is added.

As has been described above, when the electric apparatus requires a predetermined power consumption, the electric apparatus transmits to the breaker apparatus 2601 the power use request message describing the necessary power consumption P and requests the use of necessary power. The breaker apparatus 2601 permits the use of power to the electric apparatus only when power can be supplied within the range of the maximum power m permitted to the power line connected to the electric apparatus, or the sub-breaker/fuse section, and when power can be supplied within the maximum power M permitted to the breaker/fuse section 3001 of the breaker apparatus 2601. Thereby, the so-called switching-off of the circuit breaker can be prevented. Therefore, malfunction of the electric apparatus due to a sudden switching-off of the circuit breaker (i.e. stop of power supply) can be prevented.

(Fifth Embodiment)

On the basis of the data stored in the electric power consumption table 3010, e.g. data on power used by each electric apparatus, the electric power consumption controller 3009 included in the breaker apparatus of the power supply control system (see FIG. 20) performs a control operation for displaying, on the display apparatus (e.g. a TV or a monitor of a PC (personal computer)) connected to the power line network constituted by the power supply control system, a present power consumption condition (e.g. a list of electric apparatuses currently used) of the electric apparatuses connected to the power line network. Specifically, the breaker apparatus 2601 informs the user within the residence of the presence/absence of power margin prior to the use of the electric apparatus, suggests to the user to make a power margin by suitably distributing the consumable power among the electric apparatuses, or suggests a candidate of the electric apparatus which can reduce the power consumption, even when the power use request is rejected.

The breaker apparatus 2601 of the power supply control system for monitoring/controlling the household power line network manages, by the power consumption table 3010, not only the power consumption, as attributes of the electric apparatuses connected to the power line network, but also levels of power consumption in the case of the electric apparatuses capable of setting the levels of power consumption in a stepwise manner (e.g. the apparatus with a power-saving function, such as an air-conditioner, iron, light, or vacuum cleaner).

For example, even when the use of power by the electronic oven is rejected under the present power consumption condition because of overcurrent, the electronic oven may be used if the operation level of the air-conditioner is switched from "High" to "Medium." In such a case, the user is informed of this proposal, or the proposal is displayed to the user. In response, the user can accept the proposal or refrain from using the electronic oven for the time being. The breaker apparatus 2601 instructs re-setting of power consumption by each electric apparatus, when the user resets, for example, the operation level of the air-conditioner from "High" to "Medium" and requests the use of the electronic oven.

The breaker apparatus 2601 can manage an operational log of each electric apparatus in the entire power line network, by referring to the electric power consumption table 3010. For this purpose, the electric apparatuses connected to the power line network are provided with associated identifiers. Specifically, when the electric apparatus is connected to the power line network, the breaker apparatus registers the identifier of this electric apparatus and manages the condition of use of the electric apparatus on the basis of the registered identifier. Since the condition of use of the electric apparatus is managed on the basis of the identifier, when, for example, a night-time hot water apparatus is used, power supply to other electric apparatuses can be reduced, where necessary. In addition, the tendency of use of electric apparatuses may be grasped from the condition of daily use. Reflecting the tendency, the power to each electric apparatus can be set. Therefore, daily use of power can be made efficient.

The identifier of each electric apparatus connected to the power line network may be the same as the ID of the electric apparatus which serves as a sending-side address added to the message described in the first embodiment. For example, the identifier may be a product number, the name of manufacturer, the name of electric apparatus, the outlet number in the residence where the electric apparatus is connected, or a combination thereof. Besides, the identifier may be a global unique number such as an IP address. It should suffice if the identifier of each electric apparatus is available within the residence or private area where the power line network is constituted. Thus, the breaker apparatus 2601 may assign a proper identifier to the electric apparatus connected to the power line network. In this case, if the identifier of the electric apparatus is, e.g. an IP address, the management apparatus of the power line network may use an automatic address assigning protocol such as a DHCP (in this case, the management apparatus of the power line network may function as DHCP server).

The identifier assigned to the breaker apparatus 2601 of the power supply control system for monitoring/controlling the entire power line network may be a global unique identifier set at the time of manufacture, installation or use.

The identifier assigned to each electric apparatus by the breaker apparatus 2601 may be a combination of the identifier of the breaker apparatus 2601 and a number (e.g. an identifier in the residence) used by the breaker apparatus 2601 to identify each electric apparatus. In this case, the management apparatus of the power line network may use a stateless automatic structure of IPv6.

(Sixth Embodiment)

When a network is constituted by connecting electric apparatuses which are conventionally used as substantially separated apparatuses, the electric apparatuses need to have high-level information processing functions and communication functions.

In the power supply control systems according to the first to fifth embodiments, the network of house-hold electric apparatuses can be constituted without putting a great load on the electric apparatuses. The power supply control system according to the fifth embodiment is provided with the management apparatus (the breaker apparatus 2601 in the fifth embodiment) for acquiring attribute information including power consumption information on the electric apparatus connected to the power line network and managing such information in a centralized manner. Thereby, not only the power supply control but also a more complicated control for efficiently using electric power on a daily basis can be performed.

A description will now be given of a communication system capable of easily constituting a more intelligent communication network, without requiring a great load on the electric apparatus side (e.g. information processing function and communication function), by using the power supply control system as described in the above embodiments.

In a communication system according to a sixth embodiment of the present invention, attribute information of each electric apparatus, which is required for a power supply control of each electric apparatus, is acquired by means of communication.

The attribute information of the electric apparatus is necessary information relating to, for example, functions of electric apparatuses, power consumption, communication, etc. (e.g. management information relating to objects to be managed, which is necessary for network management (e.g. directory information, fault information, accounting information, etc.)). In the communication system of this embodiment, a table for managing the attribute information of electric apparatuses is called an MIB (Management Information Base) table.

Figure 23:
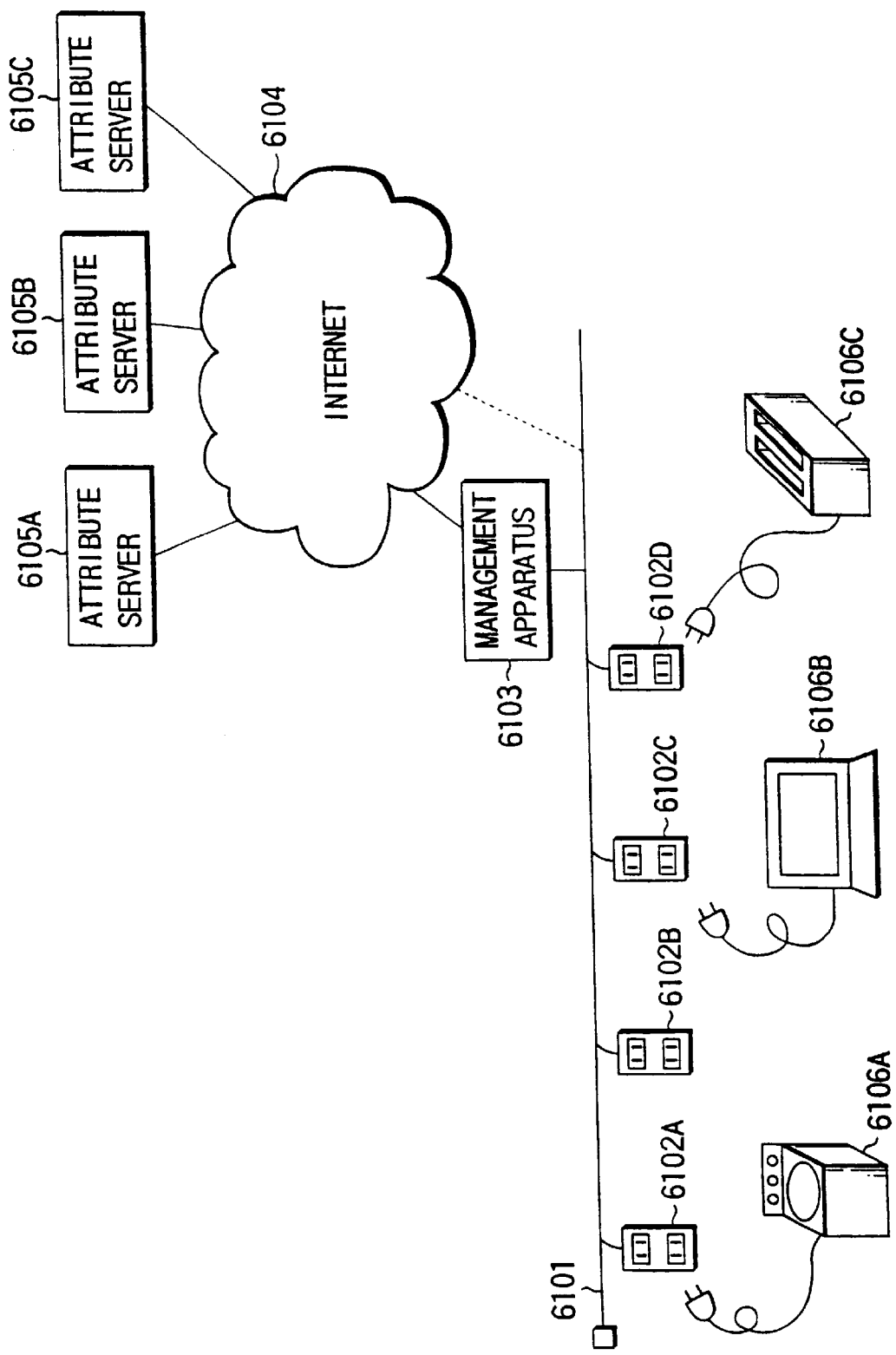
FIG. 23 schematically shows a structure of an entire communication system according to a sixth embodiment of the present invention.

FIG. 23 shows an example of the structure of the communication system according to the sixth embodiment. The communication system comprises a power line 6101, outlets 6102A to 6102D, an electric product management product (hereinafter referred to as "management apparatus") 6103, a communication network (e.g. the Internet) 6104, attribute servers 6105A to 6105C, and electric apparatuses 6106A to 6106C.

The power line 6101 is used to supply power to each electric apparatus. Digital data is transmitted among the electric apparatuses connected to the power line 6101, with the power line 6101 used as communication media.

The outlets 6102A to 6102D are connected to the power line 6101 and supply power from the power line 6101 to the electric apparatuses. The outlets 6102A to 6102D serve as data input/output (I/O) ports.

The management apparatus 6103 is connected to the power line 6101 and manages the attribute information of the electric apparatuses connected via the outlets 6102A to 6102D. The management apparatus 6103 has a communication function for accessing the Internet 6104.

The attribute servers 6105A to 6105C, in response to inquiries from the management apparatus 6103, transmits attribute information of the electric apparatuses to the management apparatus 6103. The details of the attribute servers will be described later.

Figure 24:
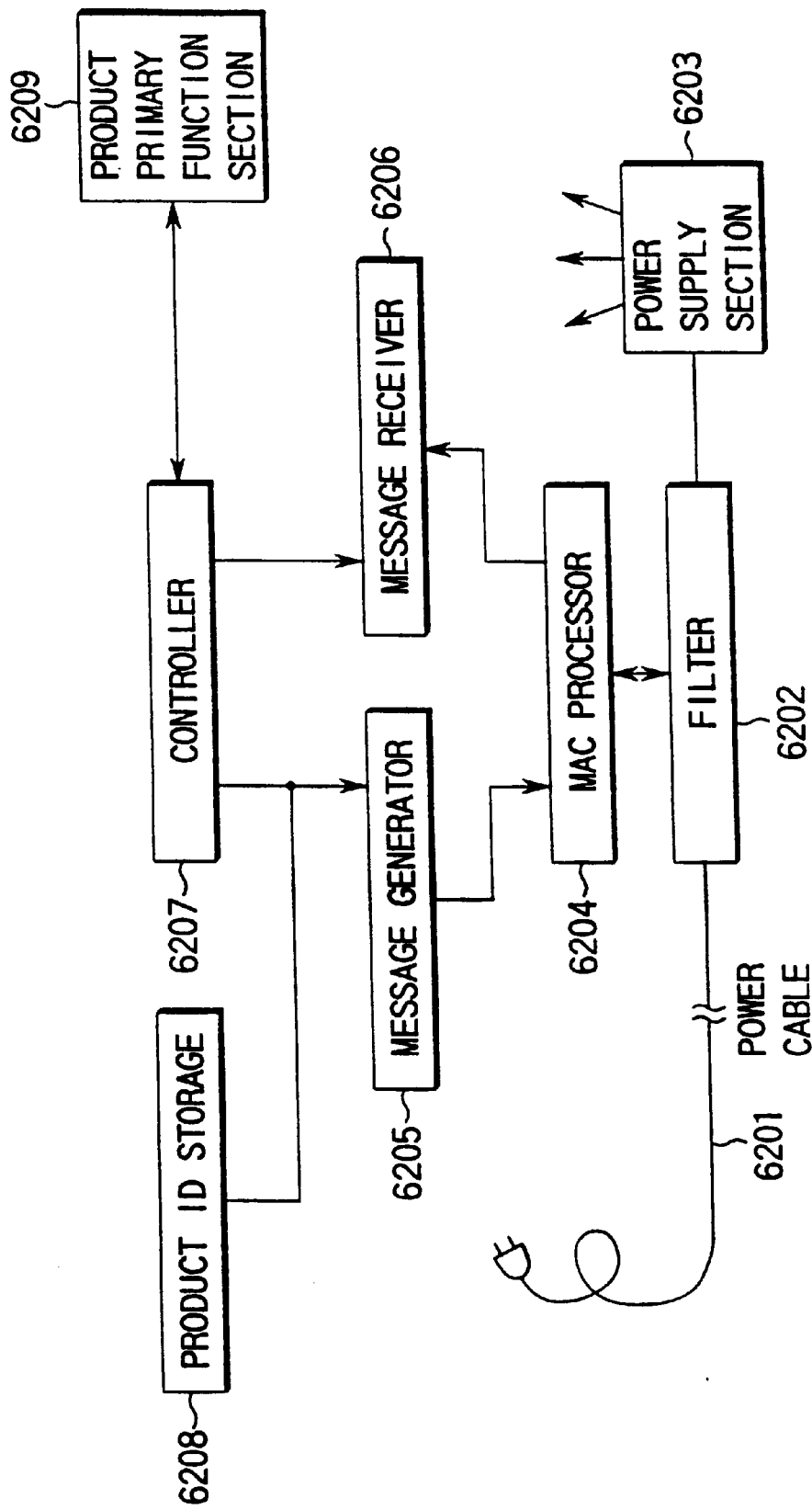
FIG. 24 schematically shows an example of the internal structure of an electric product.

FIG. 24 shows an example the structure of the main part of the electric apparatus 6106. The electric apparatus 6106 comprises a power cable 6201, a filter 6202, a power supply section 6203, an MAC processor 6204, a message generator 6205, a message receiver 6206, a controller 6207, a product ID storage 6208, and a product primary function section 6209.

When any one of the outlets 6102A to 6102D is connected to one end of the power line 6201, power is supplied to the associated electric apparatus via the power line 6201. The power cable 6201 serves also as data transmission communication media.

The filter 6202 extracts a data signal component from a signal transmitted over the power line 6102 and power cable 6201, and delivers the data signal component to the MAC processor 6204 and also delivers a message from the MAC processor 6204 to the power line 6201 (or the power line network).

The power supply section 6203 supplies power from the power line 6201 to the respective structural components of the electric apparatus.

The MAC processor 6204 controls and processes the transmission/reception of the message in accordance with the MAC (Media Access Control) system of the power line network connected to the electric apparatus.

The message generator 6205 generates a message to be sent to the power line LAN in accordance with an instruction from the controller 6207, and delivers the message to the MAC processor 6204.

When the message receiver 6206 has received a message from the power line network via the MAC processor 6204, the message receiver 6206 delivers the message to the controller 6207.

The controller 6207 controls the entire electric apparatus. In particular, the controller 6207 performs a communication control in the state in which the electric apparatus is connected to the power line network.

The product ID storage 6208 stores a product ID (e.g. an ID singly assigned to the manufacturer) for identifying the electric apparatus.

The product primary function section 6209 achieves main functions of the product or the electric apparatus (a function of toasting bread in the case of an electric toaster; a washing function in the case of a washing machine).

FIGS. 25A to 25D show examples of the format of the product ID stored in the product ID storage. FIG. 25A shows a first example consisting of a maker ID, a product ID and a product number. The product ID of this first example indicates "what company, which product, and what number of product." FIG. 25B shows a second example consisting of an attribute server address, a maker ID and a product number. The attribute server address refers to an address to be used when the attribute server 6105 storing the attribute information of the electric apparatus is accessed. The ID address of the second example is used, for example, when the attribute server 6105 designated by the attribute server address is accessed and the attribute information of the electric apparatus is searched with the maker ID and product number are used as key data. FIG. 25C shows a third example consisting of an attribute server address, a maker ID, a product ID and a product number. The ID address of the third example is used, for example, when the attribute server 6105 designated by the attribute server address is accessed and the attribute information of the electric apparatus is searched with the maker ID, product ID and product number are used as key data. FIG. 25D shows a fourth example consisting of an attribute server address and a product number. The ID address of the fourth example is used, for example, when the attribute server 6105 designated by the attribute server address is accessed and the attribute information of the electric apparatus is searched with the product number is used as key data. When the product ID of the fourth example is used, the attribute server 6105 may be provided for each maker or each product.

The attribute server address comprises an ID address, a domain name, a telephone number, or a combination thereof. In this embodiment, since the attribute server 6105 is accessed through the Internet, the attribute server address is an IP address.

Figure 26:
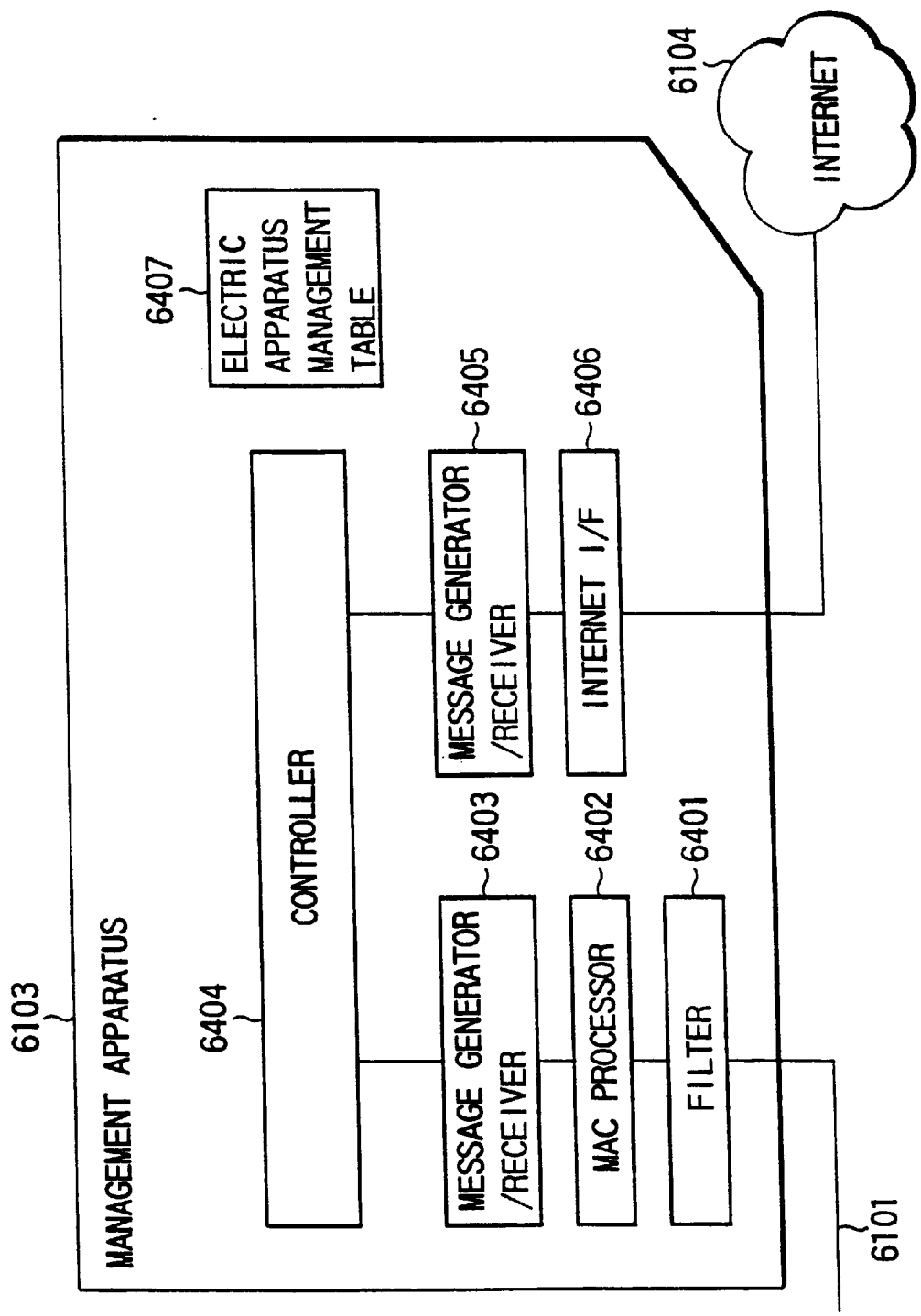
FIG. 26 schematically shows an example of an internal structure of a management apparatus.

FIG. 26 shows an example of the structure of the management apparatus 6103. The management apparatus 6103 comprises a filler 6401, an MAC processor 6402, a message generator/receiver 6403, a controller 6404, a message generator/receiver 6405, an Internet interface (I/F) 6406, and an electric apparatus management table 6407.

The filter 6401, MAC processor 6402 and message generator/receiver 6403 operate like the filter 6202, MAC processor 6204, message generator 6205 and message receiver 6206.

The controller 6404 manages attribute information of electric apparatuses 6106A to 6106C connected to the power line 6101, the state of use, etc. According to a predetermined procedure, the controller 6404 generates a predetermined message and outputs it to the message generators/receivers 6403 and 6405. For example, in accordance with received messages from the power line 6101 and Internet 6104, the controller 6404 generates messages for controlling the electric apparatuses 6106A to 6106C and sends them to the message generator/receiver 6403. In addition, in accordance with received messages from the electric apparatuses 6106A to 6106C, the controller 6404 sends messages to the power line 6101 and Internet 6104.

The message generator/receiver 6405 performs necessary processing for transmission/reception of messages between the controller 6404 and Internet 6104. For example, the message generator/receiver 6405 performs TCP/IP processing.

The Internet I/F 6406 executes a data link process for access to the Internet.

The electric apparatus management table 6407 stores information acquired from each electric apparatus 6106 (e.g. information on power consumption and use of power, an address of the attribute server to be accessed, and attribute information of electric apparatus) and attribute information of electric apparatus obtained by communication with the attribute server 6105. The table 6407 may store an MIB table of each electric apparatus in the form of a proxy table. If the MIB table of the electric apparatus is included in the electric apparatus management table 6407, the management apparatus 6103 can, as a proxy, manage the attribute information of the electric apparatus having no MIB table because of deficiency of memory capacity or processing ability. Specifically, the management apparatus 6103 accesses the attribute server designated by the product ID of the electric apparatus, acquires attribute information of the electric apparatus, and registers the acquired information on the MIB table area in the electric apparatus management table 6407.

Figure 27:
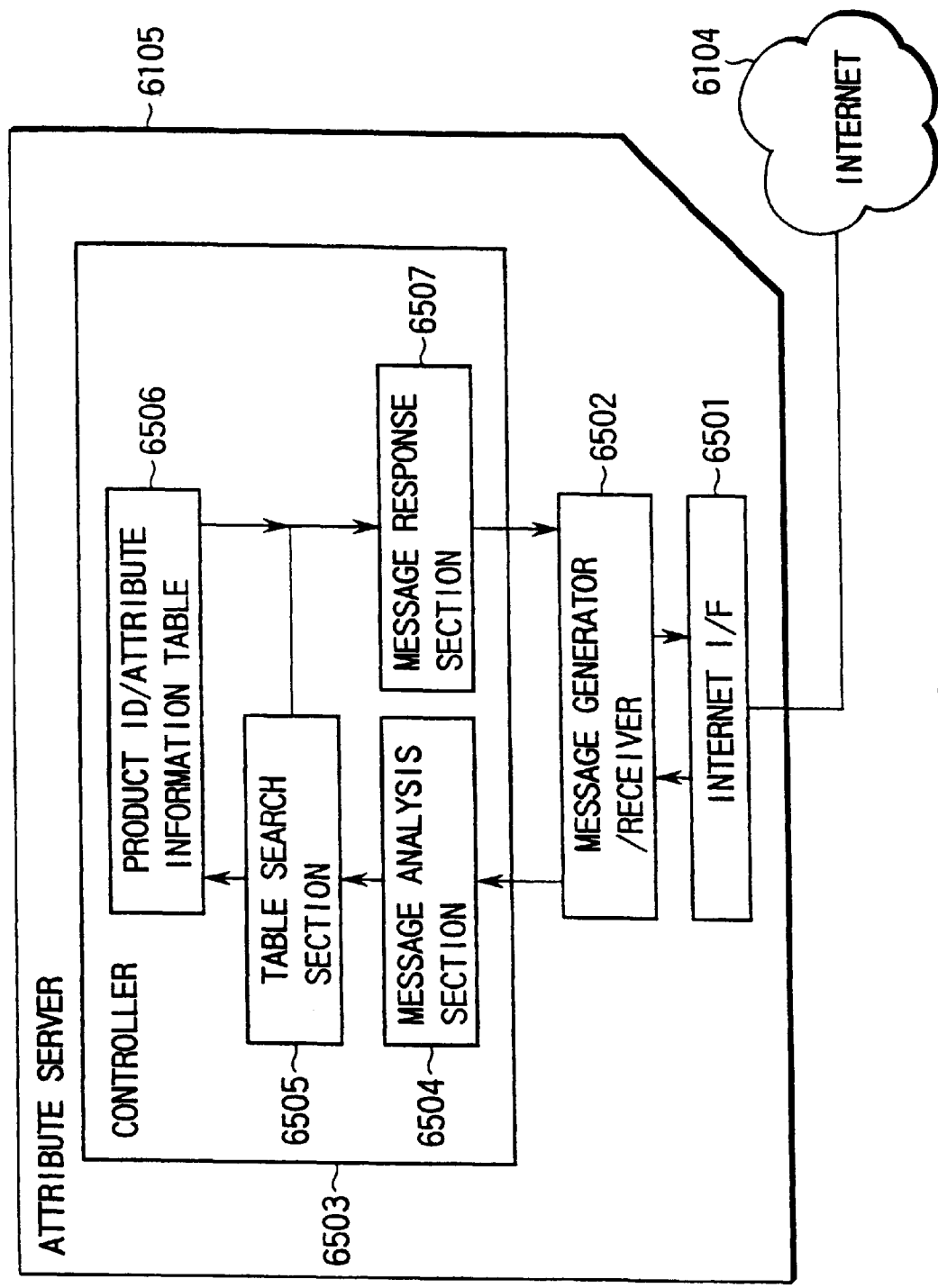
FIG. 27 schematically shows an example of an internal structure of an attribute server.

FIG. 27 shows an example of the structure of the attribute server 6105. The attribute server 6105 mainly comprises an Internet interface (I/F) 6501, a message generator/receiver 6502 and a controller 6503. The Internet I/F 6501 and message generator/receiver 6502 operate like the Internet I/F 6406 and message generator/receiver 6405 shown in FIG. 26.

The controller 6503 analyzes messages received through the Internet 6104, executes a process based on an analysis result, and generates a message for transmitting the processed result to the management apparatus 6103 through the Internet 6104. In addition, the controller 6503 registers, updates and deletes the attribute information of the electric apparatus, etc.

As is shown in FIG. 27, the controller 6503 comprises a message analysis section 6504, a table search section 6505, a product ID/attribute information table 6506 and a message response section 6507.

The message analysis section 6504 analyzes a message received through the Internet 6104. When the received message is a message for requesting attribute information, the message analysis section 6504 informs the table search section 6505 of the search instruction content (search key of attribute information, etc.) included in the message. Specifically, the table search section 6505 is informed of at least those portions of the product IDs shown in FIGS. 25A to 25D, which exclude the attribute server addresses. The table search section 6505 searches the product ID/attribute information table 6506 by using the search key provided from the message analysis section 6504.

The product ID/attribute information table 6506 is designed to search the attribute information of the electric apparatus by using parts of the product ID as a search key (e.g. maker ID and product number; maker ID and product ID and product number; or product number).

The message response section 6507 stores the search result of the table 6506 in a response message with a predetermined format (attribute information response message) to the attribute information request message, and sends the attribute information response message to the message generator/receiver 6502. The attribute information response message is sent to the management apparatus 6103 via the Internet I/F 6501 and Internet 6104.

The processing operation of the communication system shown in FIG. 23 will now be described with reference to the flow chart of FIG. 28.

The electric apparatus 6106, such as a watching machine or a refrigerator, does not have a high-cost communication function such as a TCP/IP or an application thereof. It has only a minimum necessary communication function.

Specifically, the electric apparatus 6106 has, e.g. functions of telling to the management apparatus 6103 the product ID stored in the product ID storage 6208 at the time of first activation of the electric apparatus; detecting a fault and telling the condition of the fault to the management apparatus 6103; and telling to the management apparatus 6103 an MIB table in a case where the electric apparatus has the MIB table. In addition, the electric apparatus may have functions of setting various conditions.

When the electric apparatus 6106 has been connected to any one of the outlets 6102A to 6102D and a predetermined trigger (e.g. power-on trigger) has been input (step S91), the controller 6207 of the electric apparatus 6106 instructs the message generator 6205 to generate a message including the product ID stored in the product ID storage 6208. The generated message is output to the power line 6101 via the MAC processor 6204, filter 6202 and power cable 6201 (step S92). This message may be broadcasted to the power line 6101. The message sent from the electric apparatus to the management apparatus 6103 in step S92 is called "management request message" of the electric apparatus.

The management apparatus 6103 receives all management request messages transmitted from the electric apparatuses provided in the power supply control system. When the management apparatus 6103 has received this message (step S93), this message is delivered to the controller 6404 via the filter 6401, MAC processor 6402 and message generator/receiver 6403. Upon receiving the management request message, the controller 6404 recognizes the activation of the electric apparatus 6106 and initiates an operation for acquiring attribute information of the electric apparatus (step S94). Specifically, based on the product ID included in the management request message, the controller 6404 begins to access the attribute server 6105 through the Internet, as described above. If the product ID of the electric apparatus which has sent the management request message is not registered on the electric apparatus management table 6407, the management apparatus 6103 registers the product ID on the electric apparatus management table 6407. The management apparatus 6103 may start access to the attribute server 6105, only when the attribute information of the electric apparatus is not registered on the electric apparatus management table 6407 in association with the product ID of the electric apparatus. When the product ID shown in FIG. 25A is used, the address of the attribute server to be accessed may be registered in advance in the management apparatus 6103. When the product IDs shown in FIGS. 25B to 25D are used, the Internet 6104 is accessed by using the attribute server addresses included in the product IDs.

When the attribute server corresponding to each electric apparatus is to be accessed, the management apparatus 6103 can easily identify the attribute server (without registering a specific address in advance) by using the attribute server address included in the product ID retained by each electric apparatus. It is not necessary that the attribute server 6105 retain attribute information of all electric apparatuses available in the world at one location. Different attribute servers may be provided to retain and manage attribute information of different types of electric apparatuses manufactured by different makers. Thereby, attribute information can be easily updated. If the attribute information each product needs to be changed, added or deleted, only the information on the attribute server side may be altered, resulting in an efficient up-dating of attribute information.

In the following description, suppose that the product IDs include attribute server addresses shown in FIGS. 25B to 25D. In order that the management apparatus 6103 may recognize that the attribute server address is an IP address, an address system such as SNAP (Subnetwork Access Point) may be used in part of the attribute server address and an item of "address type" may be put in the attribute server address.

When the management apparatus 6103 has recognized the IP address of the attribute server to be accessed by the attribute server address, the management apparatus 6103 transmits the attribute information request message to the attribute server 6105 through the Internet 6104. In this case, the management request message transmitted from the electric apparatus 6106 to the management apparatus 6103 may be transmitted to the attribute server as it is. Alternatively, an attribute information request message may be newly generated on the basis of the management request message and may be sent to the attribute server.

The attribute information of the electric apparatuses, which is managed by the attribute server 6105, may be the product numbers of the electric apparatus and attribute information thereof published by respective manufacturers. Alternatively, such attribute information may be provided by an independent organization who collects attribute information of electric apparatuses of each maker and edits it.

When the attribute server 6105 has received the attribute information request message, the product ID/attribute information table 6506 is searched on the basis of the search key included in the message (maker ID and product number; maker ID, product ID and product number; or product number) (steps S95 and S96). The attribute information of the electric apparatus obtained by the search is contained in an attribute information response message and the attribute information response message is sent to the management apparatus 6103 through the Internet 6104 (step S97).

If the management apparatus 6103 has received the attribute information response message (step S98), the management apparatus 6103 registers the attribute information included in the message on the electric apparatus management table 6407 in association with the product ID. Thereafter, the management apparatus 6103 manages the electric apparatus provided in the power supply control system by using the attribute information registered on the table 6407 (step S99).

The table 6407 registers, for example, the following attribute information: functions of the electric apparatuses, power consumption, necessary information relating to communication (e.g. management information relating to objects to be managed, which is necessary for network management (e.g. directory information, fault information, accounting information, etc.)), name of product, date of manufacture, maintenance information (e.g. interval of regular inspections), address of service center, method of handling, etc.

When the management apparatus 6103 has received the power use request message from, e.g. the electric apparatus 6106A (in this case the product ID may be included in the power use request message), the management apparatus 6103 searches the electric apparatus management table 6407, for example, with the product ID used as a key. Thus, the management apparatus 6103 acquires data on the predetermined power consumption of the electric apparatus 6106A. Thereafter, the management apparatus 6103 executes the power supply control process for supplying power to the electric apparatus 6106A, as illustrated in the flow charts of, e.g. FIGS. 5, 10 and 21.

The management apparatus 6103 acquires attribute information through the Internet or a public network. Accordingly, the operator of the attribute server can provide the attribute server in a center located far from the power supply control system, and can easily update, delete and confirm the data within the attribute server. In addition, based on the history of use of the attribute server, information on the frequency of access to the attribute server, on the sending side of inquiry, etc. can be obtained.

If one of the attribute servers, e.g. attribute server 6105A, which has received the attribute information request from the management apparatus 6103, does not have the requested attribute information, another attribute server, e.g. attribute server 6105B, may be accessed to search for the attribute information. Thereby, the load on the management apparatus 6103 can be reduced.

The attribute server 6105 may access another attribute server to acquire the information on the electric apparatus retained by the attribute server 6105 and various information associated with the attribute information of the electric apparatus, thereby to send the acquired synthetic information to the management apparatus 6103.

If there are several attribute servers having the same contents, it is possible to prevent accesses from concentrating on one attribute server, thus avoiding a "crowded" access state.

The attribute information of the electric apparatus obtained by the management apparatus 6103 may be told to the electric apparatus 6106 (step S100). In this case, the attribute information sent from the management apparatus 6103 can be stored in a predetermined memory and the electric apparatus 6106 can grasp its own attribute information. In case of a fault of the product primary function section 6209 of the electric apparatus 6106, the electric apparatus 6106, upon request by the user, can read out data on the maintenance (interval of regular inspections, etc.), address of service center, method of handling, etc. from the memory and can display the read-out data on a display provided on the electric apparatus 6106. Therefore, more helpful services can be provided to the user (step S101).

As has been described above, according to the sixth embodiment, there is no need to add high-cost information processing functions and communication functions to the electric apparatuses when the electric apparatuses, which are generally used as separate apparatuses because of conditions of costs, are connected to a network. Therefore, a home network can be constituted easily.

The examples of the structure of the electric apparatus in the first to sixth embodiments are shown in FIGS. 2, 13 and 24. The structural components of the electric apparatus, excluding at least the product primary function section, can be divided from the electric apparatus, and the divided components may be mounted on the rear side of the outlet. It is also possible to provide one electric apparatus (e.g. an adapter) comprising the divided components. Specifically, the adapter may be inserted in the outlet and the electric apparatus may, in turn, be connected to the adapter. Thereby, the present invention can be easily applied to conventional electric apparatuses.

When the communication system of the sixth embodiment is applied to the power supply control system described in the first to fifth embodiments, the breaker apparatus, for example, may have the functions of the management apparatus 6103 shown in FIG. 23.

In the power supply control system shown in FIG. 23, the electric apparatus 6106 and management apparatus 6103 may be interconnected by IEEE 1394, the power line 6101 may supply only power, and the IEEE 1394 may transmit data.

(Seventh Embodiment)

Other examples of the structures of the electric apparatus, breaker apparatus and management apparatus of the power supply control systems according to the above-described embodiments will now be described.

Figure 29:
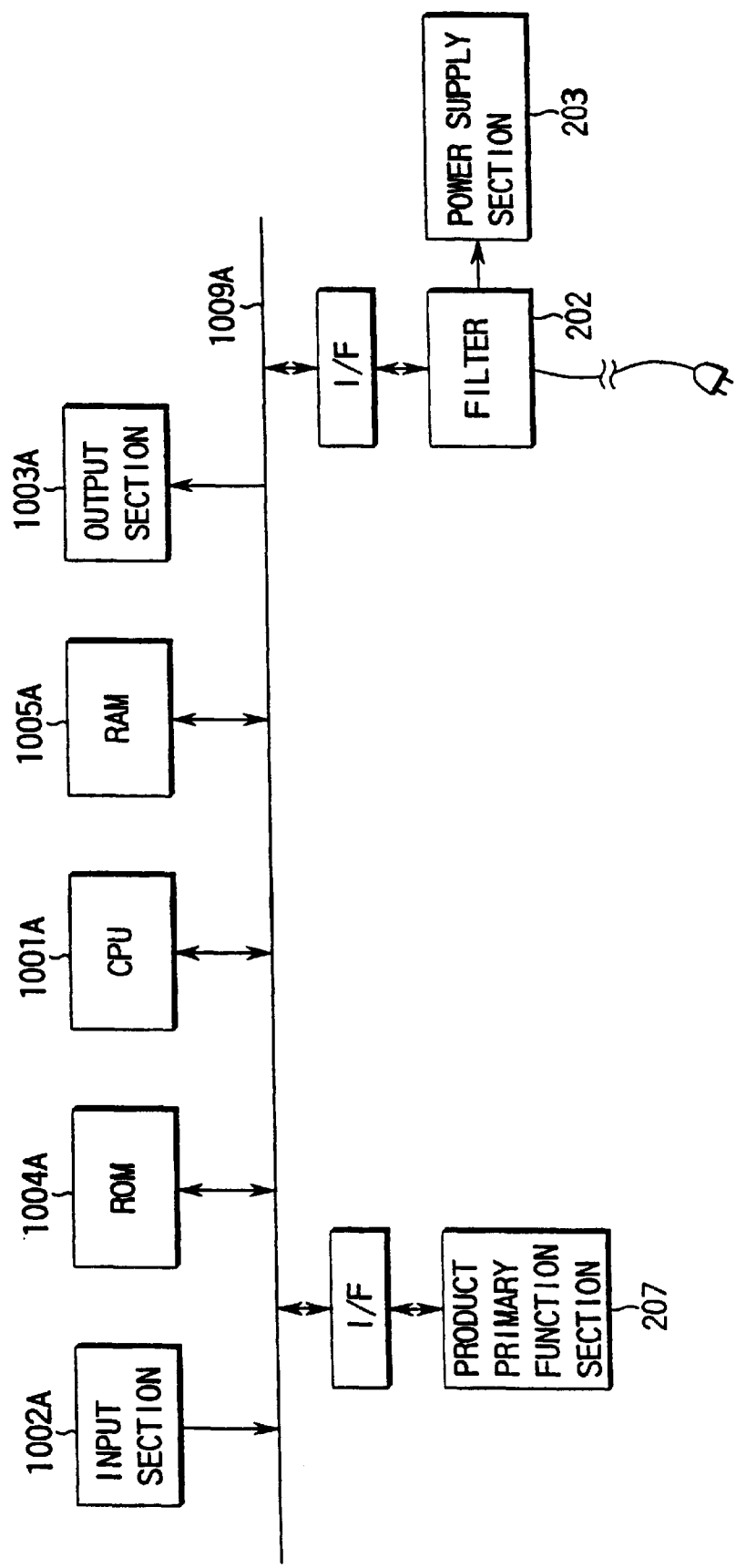
FIG. 29 shows another example of a structure of an electric apparatus.

FIG. 29 shows examples of the structures of electric apparatuses constituting parts of the power supply control system for supplying power to the electric apparatuses connected to a power line having a predetermined maximum consumable power. FIG. 29 shows a computer system wherein electric apparatuses, such as a CPU 1001A for performing arithmetic operations, an input section 1002A for inputting various instruction data, an output section 1003A such as a display for displaying various information, and recording media such as a ROM 1004A and a RAM 1005A, are interconnected by a bus 1009A.

A product primary function section 207 and a filter 202 are connected to the bus 1009A via interface sections which serve to connect these sections to the computer system. The product primary function section 207 and filter 202 operate like those in the first embodiment.

Figure 28:
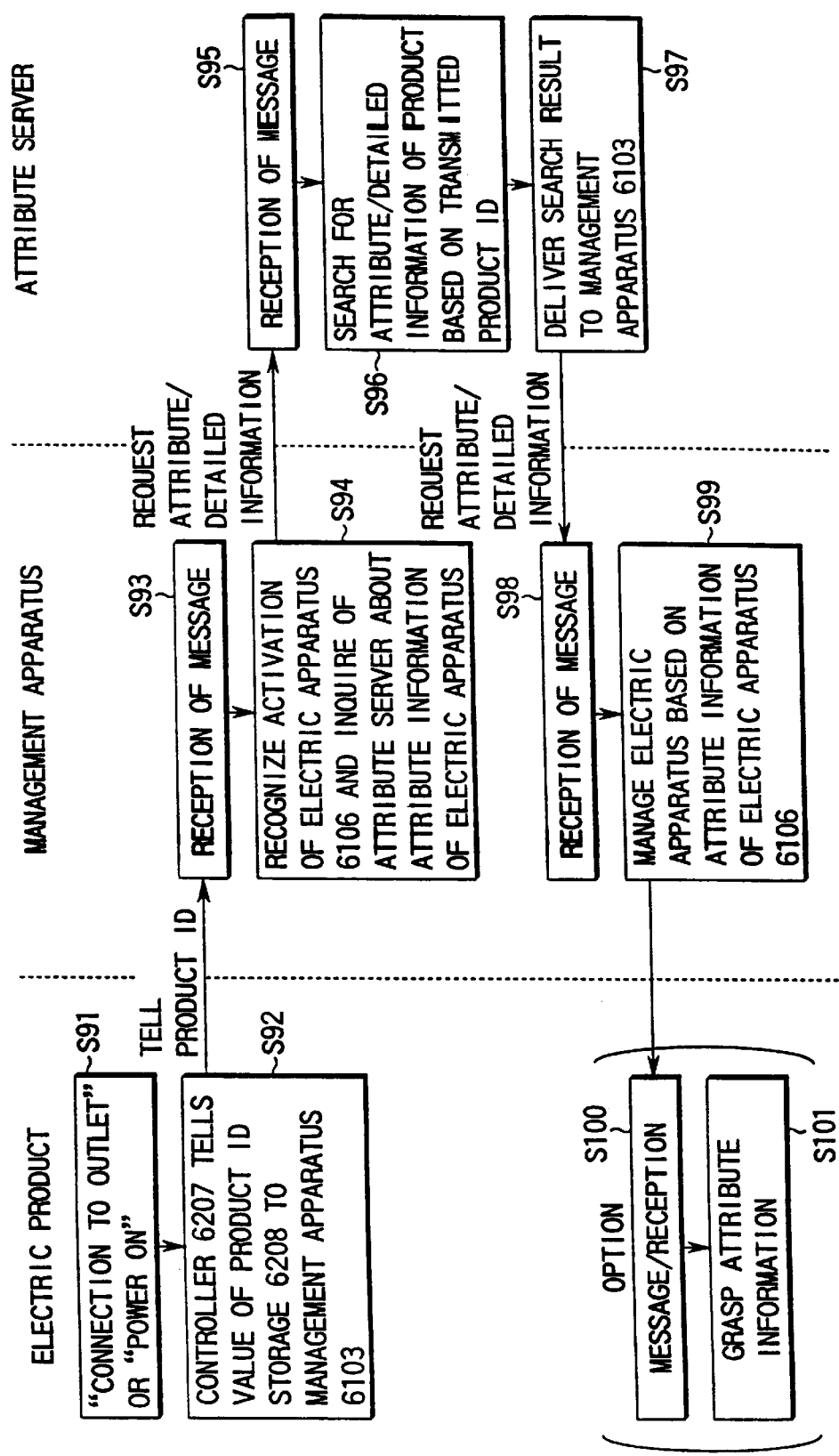
FIG. 28 is a flow chart illustrating a processing operation of the communication system shown in FIG. 23.

The ROM 1004A stores programs for executing the processes illustrated in FIGS. 4, 7 and 28, and various data necessary for these processes. According to these programs, various messages for supplying power to the electric apparatuses are transmitted/received via the filter 202.

Figure 30:
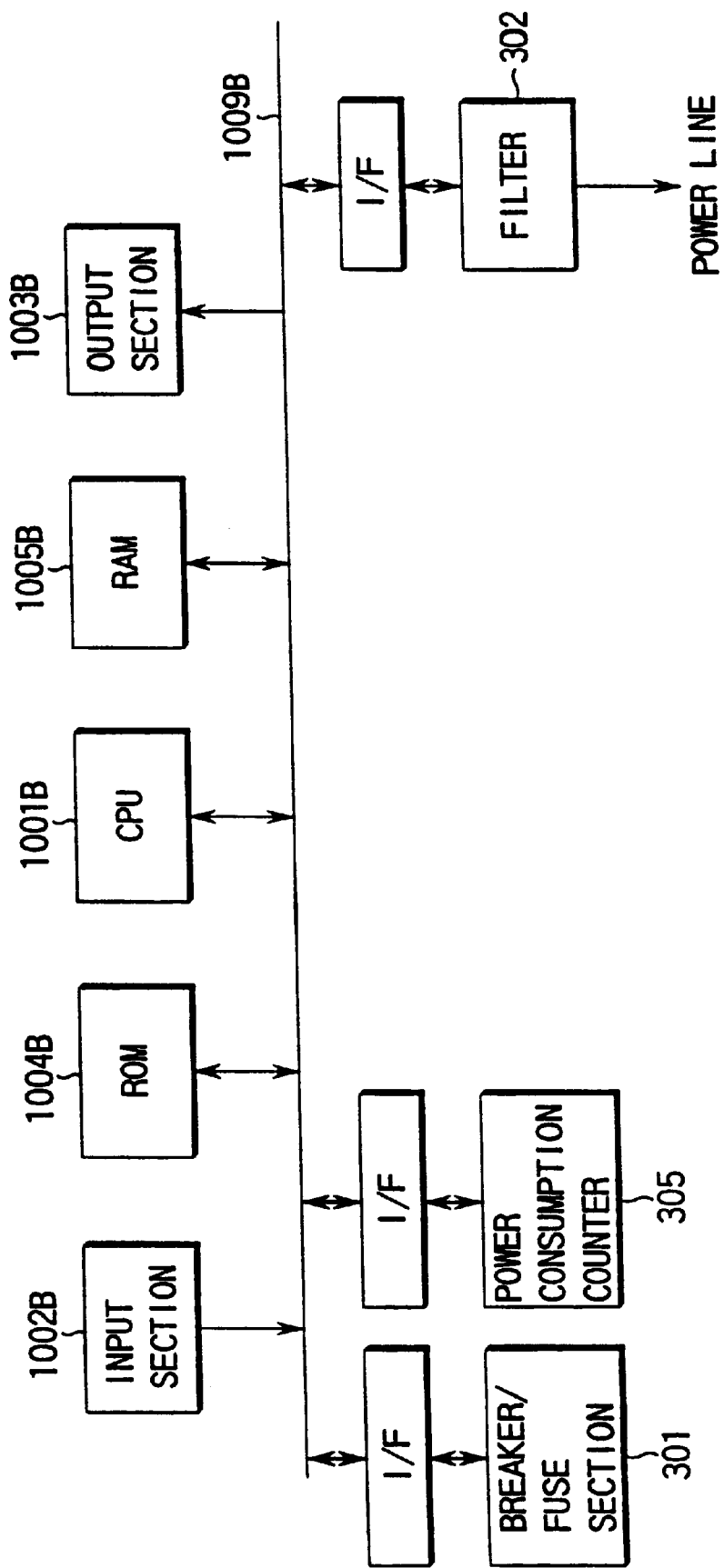
FIG. 30 shows another example of a structure of a breaker apparatus.

FIG. 30 shows an example of the structure of the breaker apparatus constituting a part of the power supply control system. As is shown in FIG. 30, the breaker apparatus mainly comprises a computer system wherein a CPU 1001B for performing arithmetic operations, an input section 1002B for inputting various instruction data, an output section 1003B such as a display for displaying various information, and recording media such as a ROM 1004B and a RAM 1005B, are interconnected by a bus 1009B.

A breaker/fuse section 301, a filter 302 and a power consumption counter 305 are connected to the bus 1009B via interface sections which serve to connect these sections to the computer system. The breaker/fuse section 301, filter 302 and power consumption counter 305 operate like those in the first embodiment.

The ROM 1004B stores programs for executing the processes illustrated in FIGS. 5, 9, 10, 21 and 28, and various data necessary for these processes. According to these programs, various messages for supplying power to the electric apparatuses are transmitted/received via the filter 302.

Figure 31:
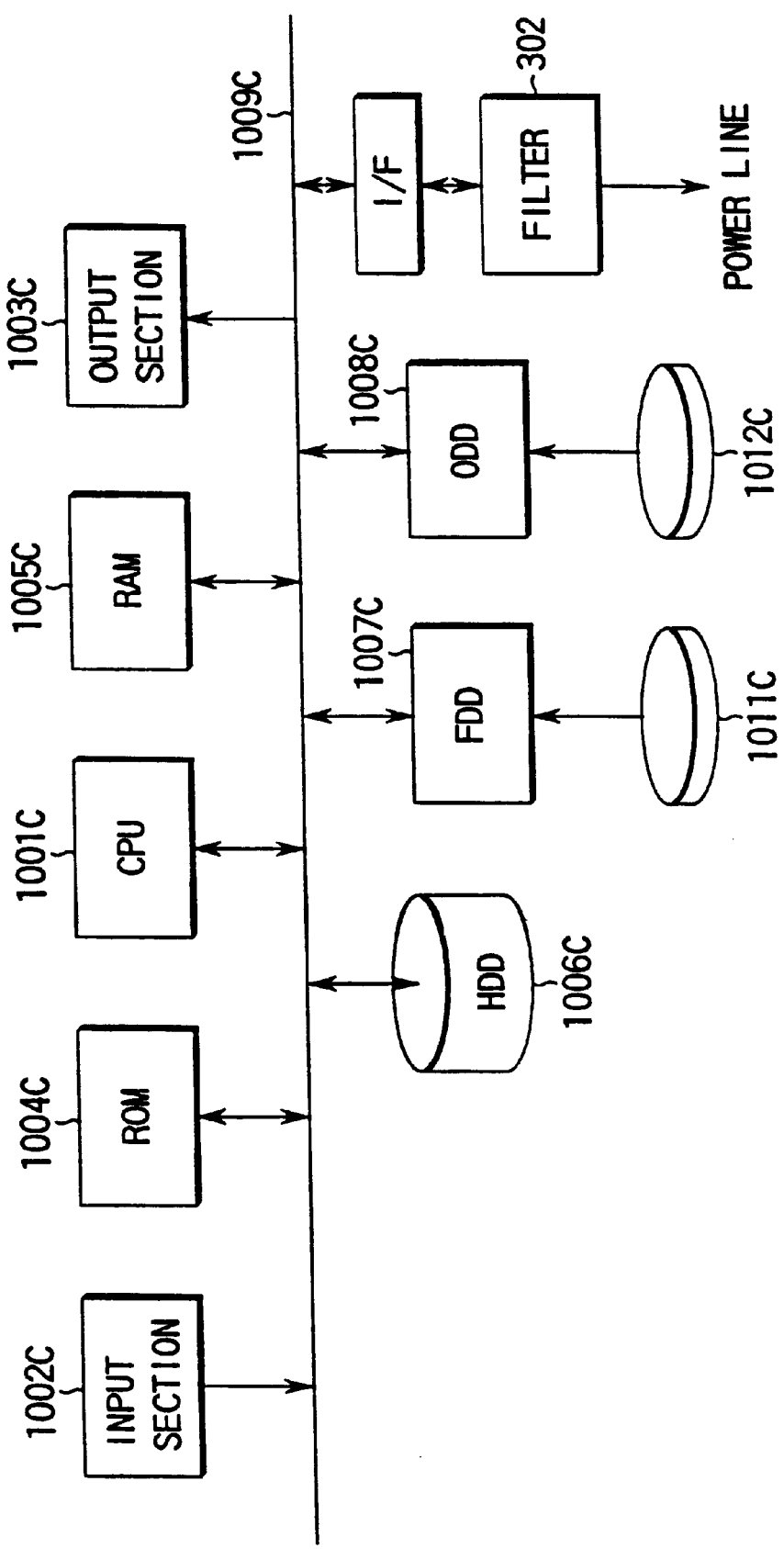
FIG. 31 shows another example of a structure of a management apparatus.

FIG. 31 shows an example of the structure of the management apparatus, as shown in FIGS. 15 and 23, constituting a part of the power supply control system. As is shown in FIG. 31, the management apparatus mainly comprises a computer system wherein a CPU 1001C for performing arithmetic operations, an input section 1002C for inputting various instruction data, an output section 1003C such as a display for displaying various information, main storage devices consisting of a ROM 1004C and a RAM 1005C and external storage devices consisting of a hard-disk drive (HDD) 1006C, floppy-disk drive (FDD) 1007C and optical disk drive (ODD) 1008C, are interconnected by a bus 1009C.

A filter 302 is connected to the bus 1009C via an interface section which serves to connect the filter 302 to the computer system. The filter 302 operates like that in the first embodiment.

Any one of the HDD 1006C, FDD 1007C and ODD 1008C stores programs for executing the processes illustrated in FIGS. 5, 9, 10, 21 and 28, and various data necessary for these processes. According to these programs, various messages for supplying power to the electric apparatuses are transmitted/received via the filter 302.

If the power supply control system according to the above embodiment is constructed such that a communication network between the management apparatus or breaker apparatus and the electric apparatuses is provided separately from the power line network for supplying power, the filter 202 (302) may be replaced with a predetermined communication interface section suitable for the communication network in FIGS. 29 to 31.

As has been described above, according to the present invention, such an undesirable situation is prevented from arising, wherein a household maximum power consumption is exceeded due to simultaneous use of electric apparatuses requiring large power and the breaker circuit is switched off. Thus, power can be supplied to each electric apparatus safely and efficiently.

There is no need to add high-cost information processing functions and communication functions to the electric apparatuses when the electric apparatuses, which are generally used as separate apparatuses because of conditions of costs, are connected to a network. Therefore, a home network can be constituted easily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A power control method for supplying power through a power line, which has a predetermined maximum consumable power, to a plurality of electric apparatuses which are connected to the power line, the method comprising:

receiving a power use request message from one of the electric apparatus via a wireless communication network;

measuring a total amount of power actually used by all of the electric apparatuses connected to the power line;

sending a first message to said electric apparatus for granting the power use request, when a sum of the total amount of power and the requested power does not exceed the predetermined maximum consumable power;

determining an upper limit of permissible power which is lower than the requested power, when the sum of the total amount of power and the requested power exceeds the maximum consumable power; and sending a second message to said electric apparatus via the wireless communication network for granting a use of the upper limit of permissible power.

2. A power control method for supplying power through a plurality of power lines, each power line having a predetermined maximum consumable power, to a plurality of electric apparatuses which are connected to one of the power lines, the method comprising:

receiving a power use request message from one of the electric apparatuses via a wireless communication network;

measuring a first total amount of power actually used by the electric apparatuses connected to the power line;

sending a first message to said electric apparatus via the wireless network for denying the power use request, when a sum of the first total amount of power and the requested power exceeds the predetermined maximum consumable power of the power line;

measuring a second total amount of power actually used by the electric apparatuses connected to all of the power lines, when a sum of the first total power and the requested power does not exceed the predetermined maximum consumable power of the power line; and sending a second message to said electric apparatus for granting or denying the power use request, in accordance with a determination of whether a sum of the second total amount of power and the requested power exceeds a predetermined maximum amount of power available for supplying to all of the power lines.

3. A power control method for supplying power through a power line, which has a predetermined maximum consumable power, to a plurality of electric apparatuses connected to the power line, the method comprising;

receiving identification information from one of the electric apparatuses via a wireless communication network;

searching for attributive information of the electric apparatus in accordance with the identification information; and performing a control for supplying power to the plural electric apparatuses in accordance with the attributive information, wherein the step of performing a control comprises:

receiving a power use request message from the electric apparatus via the wireless communication network;

measuring a total amount of power actually used by all of the electric apparatuses connected to the power line;

sending a first message to said electric apparatus via the wireless communication network for granting the power use request when a sum of the total amount of power and the requested power, whose value is included in the attributive information, does not exceed the predetermined maximum consumable power of the power line;

determining an upper limit of permissible power which is lower than the requested power, when the sum of the total amount of power and the requested power exceeds the maximum consumable power, and sending a second message to said electric apparatus via wireless communication network for granting a use of the upper limit of permissible power.

4. The method according to claim 3, wherein the step of searching for attributive information comprises accessing a database which holds the attributive information of the electric apparatus, using communication means except for the wireless communication network, to search the attributive information of said electric apparatus.

5. A power control method for supplying power through a plurality of power lines, each power line having a predetermined maximum consumable power, to a plurality of electric apparatuses which are connected to one of the power lines, the method comprising:

receiving identification information of said electric apparatus via a wireless communication network, searching for attributive information of said electric apparatus in accordance with the identification information; and performing a control for supplying power to the plural electric apparatuses in accordance with the attributive information, wherein the step of performing a control comprises:

receiving a power use request message from one of the electric apparatus via the wireless communication network;

measuring a first total amount of power actually used by the electric apparatuses connected to the power line;

sending a first message for denying the power use request via the wireless communication network, when a sum of the first total amount of power and the requested power exceeds the predetermined maximum consumable power of the power line;

measuring a second total amount of power actually used by the electric apparatuses connected to all of the power lines when a sum of the first total amount of power and the requested power does not exceed the predetermined maximum consumable power of the power line; and sending a second message to said electric apparatus via the wireless communication network for granting or denying the power use request, in accordance with a determination of whether a sum of the second total amount of the power and the requested power exceeds a predetermined maximum amount of power available for supplying to all of the power lines.

6. A power control system for supplying power through a power line, which has a predetermined maximum consumable power, to a plurality of electric apparatuses which are connected to the power line, the system comprising:

a receiving section configured to receive a power use request message from one of the electric apparatus via a wireless communication network for communicating in wireless between the power control system and the electric apparatuses;

a measuring section which measures a total amount of power actually used by all of the electric apparatuses connected to the power line;

a first sending section which sends a first message to said electric apparatus via the wireless communication network, for granting the power use request, when a sum of the total amount of power and the requested power does not exceed the predetermined maximum consumable power;

a determination section which determines an upper limit of permissible power which is lower than the requested power, when the sum of the total amount of power and the requested power exceed the maximum consumable power; and a second sending section which sends a second message to said electric apparatus via the wireless communication network, for granting a use of the upper limit of permissible power.

7. A power control system for supplying power through a plurality of power lines, each power line having a predetermined maximum consumable power to a plurality of electric apparatuses which are connected to one of the power lines, the system comprising:

a receiving section configured to receive a power use request message from one of the electric apparatuses via a wireless communication network for communicating in wireless between the power control system and the electric apparatuses;

a measuring section configured to measure a first total amount of power actually used by the electric apparatuses connected to the power line;

a first sending section configured to send a first message to said electric apparatus via the wireless communication network, for denying the power use request, when a sum of the first total amount of power and the requested power exceeds the predetermined maximum consumable power of the power line;

a measuring section configured to measure a second total amount of power actually used by the electric apparatuses connected to all of the power lines, when a sum of the first total power and the requested power does not exceed the predetermined maximum consumable power of the power line; and a second rending section configured to send a second message to said electric apparatus via the wireless communication network, for granting or denying the power use request, in accordance with a determination of whether a sum of the second total amount of power and the requested power exceeds a predetermined maximum amount of power available for supplying to all of the power lines.

8. A power control system for supplying power through a power line, which has a predetermined maximum consumable power, to a plurality of electric apparatuses connected to the power line, the system comprising:

a receiving section configured to receive identification information from one of the electric apparatuses via a wireless communication network for communicating in wireless between the power control system and the electric apparatuses;

a searching section configured to search for attributive information of the electric apparatus in accordance with the identification information; and a control section configured to perform a control for supplying power to the plural electric apparatuses in accordance with the attributive information, wherein said control section comprises:

a receiving section configured to receive a power use request message from the electric apparatus via the wireless communication network;

a measuring, section configured to measure a total amount of power actually used by all of the electric apparatuses connected to the power line;

a first sending section configured to send a first message to said electric apparatus via the wireless communication network for granting the power use request, when a sum of the total amount of power and the requested power, whose value is included in the attributive information, does not exceed the predetermined maximum consumable power of the power line;

a determination section configured to determine an upper limit of permissible power which is lower than the requested power, when the sum of the total amount of power and the requested power exceeds the maximum consumable power; and a second sending section to send a second message to said electric apparatus via the wireless communication network, for granting a use of the upper limit of permissible power.

9. A power control system for supplying power through a plurality of power lines, each power line having a predetermined maximum consumable power to a plurality of electric apparatuses which are connected to one of the power lines, the system comprising:

a receiving section configured to receive identification information of said electric apparatus via a wireless communication network for communicating in wireless between the power control system and the electric apparatuses;

a searching section configured to search for attributive information of said electric apparatus in accordance with the identification information; and a control section configured to perform a control for supplying power to the plural electric apparatuses in accordance with the attributive information, wherein said control section comprises:

a receiving section configured to receive a power use request message from one of the electric apparatus via the wireless communication network;

a measuring section configured to measure a first total amount of power actually used by the electric apparatuses connected to the power line;

a transmission section configured to send a first message via the wireless communication network, for denying the power use request, when sum of the first total amount of power and the requested power exceeds the predetermined maximum consumable power of the power line;

a measuring section which measures a second total amount of power actually used by the electric apparatuses connected to all of the power lines, when a sum of the first total amount of power and the requested power does not exceed the predetermined maximum consumable power of the power line; and a transmission section to send a second message to said electric apparatus via the wireless communication network, for granting or denying the power use request, in accordance with a determination of whether a sum of the second total amount of the power and the requested power exceeds a predetermined maximum amount of power available for supplying to all of the power lines.

10. A computer program product, in a computer system, for use in a control for supplying power through a power line, which has a predetermined maximum consumable power, to a plurality of electric apparatuses which are connected to the power line, the product comprising:

a recording medium;

instruction means, stored in the recording medium, for instructing the computer system to receive a power use request message from one of the electric apparatus via wireless communication network for communicating in wireless between the power control system and the electric apparatuses;

instruction means for instructing the computer system to measure a total amount of power actually used by all of the electric apparatuses connected to the power line;

instruction means for instructing the computer system to send a first message to said electric apparatus via the wireless communication network, for granting the power use request, when a sum of the total amount of power and the requested power does not exceed the predetermined maximum consumable power;

instruction means for instructing the computer system to determine an upper limit of permissible power which is lower than the requested power, when the sum of the total amount of power and the requested power exceeds the maximum consumable power; and instruction means for instructing the computer system to send a second message to said electric apparatus for granting a use of the upper limit of permissible power.

11. A computer program product, in a computer system, for use in a control for supplying power through a plurality of power lines, each power line having a predetermined maximum consumable power to a plurality of electric apparatuses which are connected to one of the power lines, the product comprising:

a recording medium;

first instruction means, stored in the recording medium, for instructing the computer system to receive a power use request message from one of the electric apparatuses via a wireless communication network for communicating in wireless between the power control system and the electric apparatuses;

second instruction means for instructing the computer system to measure a first total amount of power actually used by the electric apparatuses connected to the power line;

third instruction means for instructing the computer system to send a first message to said electric apparatus via the wireless communication network for denying the power use request, when a sum of the first total amount of power and the requested power exceeds the predetermined maximum consumable power of the power line;

fourth instruction means for instructing the computer system to measure a second total amount of power actually used by the electric apparatuses connected to all of the power lines, when a sum of the first total power and the requested power does not exceed the predetermined maximum consumable power of the power line; and fifth instruction means for instructing the computer system to send a second message to said electric apparatus via the wireless communication network for granting or denying the power use request, in accordance with determination of whether a sum of the second total amount of power and the requested power exceeds a predetermined maximum amount of power available for supplying to all of the power lines.

12. A computer program product, in a computer system, for use in a control for supplying power through a power line, which has a predetermined maximum consumable power, to a plurality of electric apparatuses connected to the power line, the product comprising:

a recording medium;

first instruction means, stored in the recording medium, for instructing, the computer system to receive identification information from one of the electric apparatuses via a wireless communication network for communication in wireless between the power control system and the electric apparatuses;

second instruction means for instructing the computer system to search for attributive information of the electric apparatus in accordance with the identification information; and third instruction means for instructing the computer system to perform a control for supplying power to the plural electric apparatuses in accordance with the attributive information wherein said third instruction means comprises:

instruction means for instructing the computer system to receive a power use request message from the electric apparatus via the wireless communication network;

instruction means for instructing the computer system to measure a total amount of power actually used by all of the electric apparatuses connected to the power line;

instruction means for instructing the computer system to send a first message to said electric apparatus for granting the power use request, when a sum of the total amount of power and the requested power, whose value is included in the attributive information does not exceed the predetermined maximum consumable power of the power line;

instruction means for instructing the computer system to determine an upper limit of permissible power which is lower than the requested power, when the sum of the total amount of power and the requested power exceeds the maximum consumable power; and instruction means for instructing the computer system to send a second message to said electric apparatus via the wireless communication network, for granting a use of the upper limit of permissible power.

13. A computer program product, in a computer system, for use in a control for supplying power through a plurality of power lines, each power line having a predetermined maximum consumable power, to a plurality of electric apparatuses which are connected to one of the power lines, the product comprising:

a recording medium;

first instruction means, stored in the recording medium, for instructing the computer system to receive identification information of said electric apparatus via a wireless communication network for communicating in wireless between the power control system and the electric apparatuses;

second instruction means for instructing the computer system to search for attributive information of said electric apparatus in accordance with the identification information; and third instruction means for instructing the computer system to perform a control for supplying power to the plural electric apparatuses in accordance with the attributive information, wherein said third instruction means comprises:

instruction means for instructing the computer system to receive a power use request message from one of the electric apparatus via the wireless communication network;

instruction means for instructing the computer system to measure a first total amount of power actually used by the electric apparatuses connected to the power line;

instruction means for instructing the computer system to send a first message via the wireless communication network, for denying the power use request when a sum of the first total amount of power and the requested power exceeds the predetermined maximum consumable power of the power line;

instruction means for instructing the computer system to measure a second total amount of power actually used by the electric apparatuses connected to all of the power lines, when a sum of the first total amount of power and the requested power does not exceed the predetermined maximum consumable power of the power line; and instruction means for instructing the computer system to send a second message to said electric apparatus via the wireless communication network, for granting or denying the power use request, in accordance with a determination of whether a sum of the second total amount of the power and the requested power exceeds a predetermined maximum amount of power available for supplying to all of the power lines.

* * * * *